US012677110B2

(12) United States Patent
Kato et al.

(10) Patent No.: US 12,677,110 B2
(45) Date of Patent: Jul. 7, 2026

(54) INFORMATION PROCESSING DEVICE, INFORMATION PROCESSING METHOD, AND RECORDING MEDIUM STORING AN INFORMATION PROCESSING PROGRAM

(71) Applicant: TOYOTA JIDOSHA KABUSHIKI KAISHA, Toyota (JP)

(72) Inventors: Takahiro Kato, Numazo (JP); Takashi Kashimura, Nagoya (JP); Kazuyuki Yokota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 411 days.

(21) Appl. No.: 18/338,608

(22) Filed: Jun. 21, 2023

(65) Prior Publication Data

US 2023/0421989 A1 Dec. 28, 2023

(30) Foreign Application Priority Data

Jun. 24, 2022 (JP) ................................. 2022-102106

(51) Int. Cl.
| | |
|---|---|
| *H04W 4/021* | (2018.01) |
| *H04W 68/00* | (2009.01) |
| *H04W 72/566* | (2023.01) |

(52) U.S. Cl.
CPC ......... *H04W 4/021* (2013.01); *H04W 68/005* (2013.01); *H04W 72/569* (2023.01)

(58) Field of Classification Search
CPC . H04W 4/021; H04W 68/005; H04W 72/569; H04W 4/029; H04W 4/90; H04W 4/023; H04W 4/02; H04W 4/80; H04W 4/022; H04W 4/30; H04W 84/12; H04W 4/40;

H04W 12/03; H04W 12/02; H04W 4/025; H04W 12/64; H04W 4/024; H04W 4/33; H04W 64/00; H04W 4/027; H04W 4/026; H04W 4/38; H04W 52/0251; H04W 12/63; G08B 21/0205; G08B 21/0261; G08B 21/028; G08B 21/0277; G08B 21/0272; G08B 21/0269; G08B 21/24; G08B 21/0294; G08B 21/0255; G08B 21/02; G08B 21/22; G08B 21/043; G08B 25/08; G08B 25/016; G08B 21/0288; G08B 21/0258; G08B 21/0208; G08B 21/0216;

(Continued)

(56) References Cited

U.S. PATENT DOCUMENTS

| | | | | |
|---|---|---|---|---|
| 2022/0415153 | A1* | 12/2022 | Hwang | ................. H04W 4/029 |
| 2022/0416974 | A1 | 12/2022 | Liu et al. | |
| 2023/0273034 | A1 | 8/2023 | Tokuchi | |

FOREIGN PATENT DOCUMENTS

| | | |
|---|---|---|
| CN | 112344948 A | 2/2021 |
| CN | 112514425 A | 3/2021 |

(Continued)

*Primary Examiner* — Jing Gao
(74) *Attorney, Agent, or Firm* — Dinsmore & Shohl LLP

(57) ABSTRACT

An information processing device including a processor, wherein the processor is configured to: acquire zone information indicating a zone in which a safety related action is to be urged to a user along a path; and in a case in which a current position of the user moving along the path is contained in a plurality of zones indicated by the acquired zone information, cause a notification corresponding to a zone having a high predetermined priority from among the plurality of zones, to be executed by a notification section.

15 Claims, 15 Drawing Sheets

(58) Field of Classification Search

CPC ............ G08B 21/0236; G08B 21/0453; G08B
21/0476; G08G 1/005; H04M 2250/10;
H04M 1/72457; H04M 1/72424; H04M
1/72436; H04M 1/72454; H04M 1/72475;
H04L 67/52; H04L 67/54; H04L 67/535;
G06F 2221/2111; G06F 16/29; G01S
5/0295; G01S 5/0284; G01S 19/42

See application file for complete search history.

(56)                    References Cited

FOREIGN PATENT DOCUMENTS

| | | | |
|---|---|---|---|
| JP | 2017084152 A | * | 5/2017 |
| WO | 2019240070 A1 | | 12/2019 |

* cited by examiner

INFORMATION PROCESSING DEVICE, INFORMATION PROCESSING METHOD, AND RECORDING MEDIUM STORING AN INFORMATION PROCESSING PROGRAM

CROSS-REFERENCE TO RELATED APPLICATION

This application is based on and claims priority under 35 USC 119 from Japanese Patent Application No. 2022-102106 filed on Jun. 24, 2022, the disclosure of which is incorporated by reference herein.

BACKGROUND

Technical Field

The present disclosure relates to an information processing device, an information processing method, and a recording medium storing an information processing program.

Related Art

An action confirmation system enabling a specific action of a moving person to be confirmed is disclosed in WO2019/240070.

In the technology of WO2019/240070, a danger to a wearer is notified in a case in which a distance between a danger site and a current position of the wearer is determined to be less than a specific value.

However, the technology of WO2019/240070 is not clear about which danger site to the wearer it is that a notification of danger refers to in a case in which distances between plural danger sites and the current position of the wearer have become less than the specific value at the same time, and so there is room for improvement.

SUMMARY

An object of the present disclosure is to provide an information processing device, an information processing method, and a recording medium storing an information processing program that are capable of causing execution of a specific notification in priority over another notification in a case in which there are plural executable notifications urging a safety related action to a user moving along a path.

An information processing device according to a first aspect includes an acquisition section that acquires zone information indicating a zone in which a safety related action is to be urged to a user along a path, and a control section that, in a case in which a current position of the user moving along the path is contained in a plurality of zones indicated by the zone information acquired by the acquisition section, cause a notification corresponding to a zone having a high predetermined priority from among the plurality of zones, to be executed by a notification section.

In the information processing device of the first aspect, the acquisition section acquires the zone information indicating the zone in which a safety related action is to be urged to the user. The control section causes the notification corresponding to a zone having the high predetermined priority from among the plurality of zones, to be executed by the notification section in a case in which the current position of the user moving along the path is contained in plurality of zones indicated by the zone information acquired by the acquisition section. Thereby this information processing device enables the specific notification to be executed in priority over another notification in a case in which there are plural executable notifications urging a safety related action to the user moving along the path.

An information processing device of a second aspect is the first aspect wherein the control section causes a notification corresponding to one of the zones indicated by the zone information as including time information related to a time when a concern with respect to safety of the user occurred in the past from among the plurality of zones, to be executed by the notification section in priority over a notification corresponding to another of the zones indicated by the zone information as not including the time information.

In the information processing device of the second aspect, the control section causes the notification corresponding to the zone indicated by the zone information as including the time information from among the plurality of zones, to be executed by the notification section in priority over the notification corresponding to the zone as indicated by the zone information not including the time information. Thereby this information processing device enables the notification corresponding to a zone having high reliability containing the time the concern occurred in the past to be executed in priority over another notification in a case in which there are plural executable notifications urging a safety related action to the user moving along the path.

An information processing device of a third aspect is the second aspect wherein the zone indicated by the zone information as including the time information is a zone in which the concern occurred within a specific period of time from a current date and time.

In the information processing device of a third aspect the zone indicated by the zone information as including the time information is a zone in which the concern occurred within the specific period of time from the current date and time. Thereby this information processing device enables avoidance of a situation in which the notification corresponding to the zone indicated by the zone information as including older time information than the specific period of time prior to the current date and time is executed in priority over another notification.

An information processing device of a fourth aspect is the second aspect or the third aspect, wherein the zone indicated by the zone information as including the time information is a zone in which the concern occurred in a time band of around a specific period of time in the past from a current date and time.

In the information processing device of the fourth aspect, the zone indicated by the zone information as including the time information is a zone in which the concern occurred in the time band of around the specific period of time in the past from the current date and time. Thereby this information processing device enables avoidance of a situation in which a notification corresponding to the zone indicated by the zone information as including time information exceeding around the specific period of time from the current date and time is executed in priority over another notification.

An information processing device of a fifth aspect is any one of the second aspect to the fourth aspect, wherein in a case in which the current position of the user moving along the path is contained in a plurality of the zones indicated by the zone information containing the time information, the control section causes a notification corresponding to a zone having a most recent time the concern occurred as indicated in the time information from among the plurality of zones, to be executed by the notification section.

In the information processing device of the fifth aspect, the control section causes the notification corresponding to the zone, from out of the plurality of zones, having the most recent time the concern occurred as indicated in the time information to be executed by the notification section in a case in which the current position of the user moving along the path is contained in the plurality of the zones indicated by the zone information containing the time information. Thereby the information processing device is able to execute notification corresponding to a zone with a high reliability having the freshest information in priority over other notifications in a case in which there are plural executable notifications urging a safety related action to a user moving along a path.

An information processing device of a sixth aspect is any one of the second aspect to fourth aspect wherein in a case in which the current position of the user moving along the path is contained in a plurality of the zones as indicated by the zone information containing the time information, the control section causes a notification corresponding to a zone having a most frequent occurrence of the concern per unit time from among the plurality of zones, to be executed by the notification section.

In the information processing device of the sixth aspect, the control section causes the notification corresponding to a zone having the most frequent occurrence of the concern per unit time from among the plurality of zones, to be executed by the notification section in a case in which the current position of the user moving along the path is contained in the plurality of the zones as indicated by the zone information containing the time information. Thereby this information processing device is able to cause the execution of the notification corresponding to a zone with a high reliability having the most frequent occurrences of the concern per unit time to be executed in priority over other notifications in a case in which there are plural executable notifications urging a safety related action to a user moving along a path.

An information processing device of a seventh aspect is any one of the second aspect to fourth aspect wherein in a case in which the current position of the user moving along the path is contained in a plurality of the zones as indicated by the zone information containing the time information, the control section causes a notification corresponding to a zone having a most recent time of occurrence of the concern in the past to the current date and time from among the plurality of zones, to be executed by the notification section.

In the information processing device of the seventh aspect, the control section causes the notification corresponding to the zone from out of the plurality of zones having the most recent time of occurrence of the concern in the past to the current date and time to be executed by the notification section in a case in which the current position of the user moving along the path is contained in the plurality of zones as indicated by the zone information containing the time information. Thereby this information processing device enables the notification corresponding to the zone with a high reliability having the most recent time of occurrence of the concern in the past to the current date and time to be executed in priority over another notification in a case in which there are plural executable notifications urging a safety related action to the user moving along the path.

An information processing device of an eighth aspect is the first aspect, wherein the plurality of zones includes a confirmation zone where the user is to be urged to perform a confirmation action to confirm traffic safety as the safety related action, and a retreat zone where the user is to be urged to perform a retreat action to retreat from the current position as the safety related action, and the control section causes a notification corresponding to the retreat zone to be executed by the notification section in priority over a notification corresponding to the confirmation zone in a case in which the current position of the user moving along the path is contained in the confirmation zone and the retreat zone.

In the information processing device of the eighth aspect, the zones include the confirmation zone where the user is to be urged to perform a confirmation action and a retreat zone where the user is to be urged to perform a retreat action. The control section causes a notification corresponding to the retreat zone to be executed by the notification section in priority over a notification corresponding to the confirmation zone in a case in which the current position of the user moving along the path is contained in the confirmation zone and the retreat zone. Thereby this information processing device enables the user to be urged to retreat from a dangerous site along the path by executing the notification corresponding to the retreat zone in priority over the notification corresponding to the confirmation zone in a case in which there are plural executable notifications urging a safety related action to the user moving along the path.

An information processing device of a ninth aspect is the eighth aspect, wherein the control section causes a notification corresponding to the confirmation zone to be executed by the notification section in priority over a notification corresponding to the retreat zone in a case in which the current position of the user moving along the path is contained in the confirmation zone and the retreat zone and is at a specific distance or greater away from a boundary of the retreat zone.

In the information processing device of the ninth aspect, the control section causes the notification corresponding to the confirmation zone to be executed by the notification section in priority over the notification corresponding to the retreat zone in a case in which the current position of the user moving along the path is contained in the confirmation zone and the retreat zone and is at the specific distance or greater away from a boundary of the retreat zone. Thereby this information processing device enables the notification corresponding to the confirmation zone to be executed by the notification section in priority over the notification corresponding to the retreat zone in a case in which the user can be assumed to be dawdling in the retreat zone intentionally.

An information processing device of a tenth aspect is the eight aspect or the ninth aspect, wherein the control section causes a notification corresponding to the confirmation zone to be executed by the notification section in priority over a notification corresponding to the retreat zone in a case in which the current position of the user moving along the path is contained in the confirmation zone and the retreat zone and a specific period of time has elapsed since being contained in the retreat zone.

In the information processing device of the tenth aspect, the control section causes the notification corresponding to the confirmation zone to be executed by the notification section in priority over the notification corresponding to the retreat zone in a case in which the current position of the user moving along the path is contained in the confirmation zone and the retreat zone and the specific period of time has elapsed since being contained in the retreat zone. Thereby this information processing device enables the notification corresponding to the confirmation zone to be executed by the notification section in priority over the notification corresponding to the retreat zone in a case in which the user can be assumed to be dawdling in the retreat zone intentionally.

An information processing device of an eleventh aspect is the first aspect, wherein the plurality of zones includes a confirmation zone where the user is to be urged to perform a confirmation action to confirm traffic safety as the safety related action, and a retreat zone where the user is to be urged to perform a retreat action to retreat from the current position as the safety related action, and the control section causes a notification corresponding to the confirmation zone to be executed by the notification section in priority over a notification corresponding to the retreat zone in a case in which the current position of the user moving along the path is contained in the confirmation zone and the retreat zone.

In the information processing device of the eleventh aspect, the zones include the confirmation zone where the user is to be urged to perform a confirmation action and the retreat zone where the user is to be urged to perform a retreat action. The control section causes the notification corresponding to the confirmation zone to be executed by the notification section in priority over a notification corresponding to the retreat zone in a case in which the current position of the user moving along the path is contained in the confirmation zone and the retreat zone. Thereby this information processing device enables the user to be urged to confirm traffic safety on the path by the notification corresponding to the confirmation zone being executed in priority over the notification corresponding to the retreat zone in a case in which there are plural executable notifications urging a safety related action to the user moving along the path.

An information processing device of a twelfth aspect is the eleventh aspect, wherein the control section causes a notification corresponding to the retreat zone to be executed by the notification section in priority over a notification corresponding to the confirmation zone in a case in which the current position of the user moving along the path is contained in the confirmation zone and the retreat zone and is at a specific distance or greater away from a boundary of the retreat zone.

In the information processing device of the twelfth aspect, the control section causes the notification corresponding to the retreat zone to be executed by the notification section in priority over the notification corresponding to the confirmation zone in a case in which the current position of the user moving along the path is contained in the confirmation zone and the retreat zone and is at the specific distance or greater away from the boundary of the retreat zone. Thereby this information processing device enables a time to retreat from the retreat zone to be suppressed from being prolonged, by causing the notification corresponding to the retreat zone to be executed by the notification section in priority over the notification corresponding to the confirmation zone in a case in which a user can be assumed to be moving toward a center of the retreat zone.

An information processing device of a thirteenth aspect is the eleventh aspect or the twelfth aspect, wherein the control section causes a notification corresponding to the retreat zone to be executed by the notification section in priority over a notification corresponding to the confirmation zone in a case in which the current position of the user moving along the path is contained in the confirmation zone and the retreat zone and a specific period of time has elapsed since being contained in the retreat zone.

In the information processing device of the thirteenth aspect, the control section causes the notification corresponding to the retreat zone to be executed by the notification section in priority over the notification corresponding to the confirmation zone in a case in which the current position of the user moving along the path is contained in the confirmation zone and the retreat zone and the specific period of time has elapsed since being contained in the retreat zone. Thereby this information processing device enables a time to retreat from the retreat zone to be suppressed from being prolonged, by causing the notification corresponding to the retreat zone to be executed by the notification section in priority over the notification corresponding to the confirmation zone in a case in which a user can be assumed to be moving toward a center of the retreat zone.

An information processing method of a fourteenth aspect is processing for execution by a computer, the processing including acquiring zone information indicating a zone in which a safety related action is to be urged to a user along a path, and in a case in which a current position of the user moving along the path is contained in a plurality of zones indicated by the acquired zone information, causing a notification corresponding to a zone having a high predetermined priority from among the plurality of zones, to be executed by a notification section.

A fifteenth aspect is a non-transitory recording medium storing an information processing program. The information processing program causes processing to be executed by a computer, the processing including acquiring zone information indicating a zone in which a safety related action is to be urged to a user along a path, and in a case in which a current position of the user moving along the path is contained in a plurality of zones indicated by the acquired zone information, causing a notification corresponding to a zone having a high predetermined priority from among the plurality of zones, to be executed by a notification section.

The information processing device, information processing method, and recording medium storing an information processing program according to the present disclosure enable a specific notification to be caused to be executed in priority over another notification in a case in which there are plural executable notifications urging a safety related action to a user moving along a path.

BRIEF DESCRIPTION OF THE DRAWINGS

Exemplary embodiments of the present disclosure will be described in detail based on the following figures, wherein.

DETAILED DESCRIPTION

Description follows regarding an information processing system 10 according to the present exemplary embodiments.

The information processing system 10 according to the present exemplary embodiments is a system to cause a specific notification to be executed in priority over another notification in a case in which there are plural executable notifications urging a safety related action to a user moving along a path.

First Exemplary Embodiment

Figure 1:
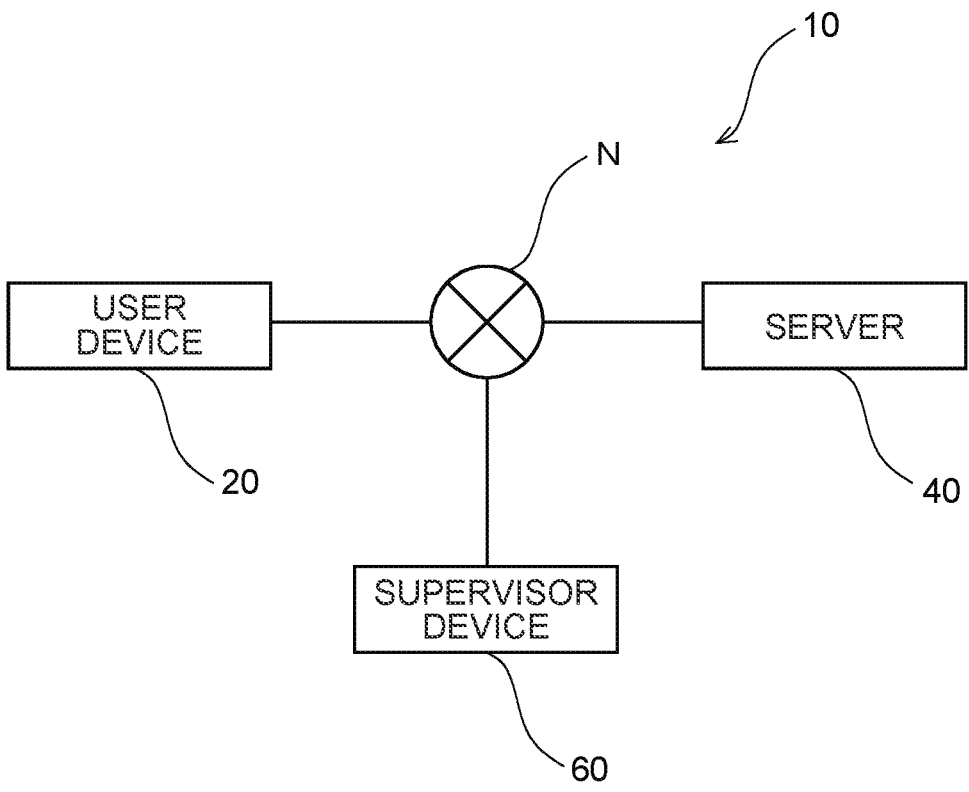
FIG. 1 is a diagram illustrating a schematic configuration of an information processing system according to the present exemplary embodiment.

First description follows regarding a first exemplary embodiment of the information processing system 10 according to the present exemplary embodiments. FIG. 1 is a diagram illustrating a schematic configuration of the information processing system 10.

As illustrated in FIG. 1, the information processing system 10 includes a user device a server 40, and a supervisor device 60. The user device 20, the server 40, and the supervisor device 60 are connected together through a network N so as to be able to communicate with each other.

The user device 20 is a device carried by a user. In the first exemplary embodiment the user is a "child of lower primary school age". Moreover, for example, the user device 20 is mounted to a shoulder strap of a school bag worn on the back of a user. The user device is an example of an "information processing device".

The server 40 is a server computer belonging to a specific business operator.

The supervisor device 60 is a device owned by parent who is a supervisor of the user. The supervisor device 60 may employ, for example, a general purpose computer device such as a personal computer (PC), or may be a mobile device such as a portable notebook PC, a smartphone, or a tablet device. In the first exemplary embodiment the supervisor device 60 is, as an example, a smartphone.

Figure 2:
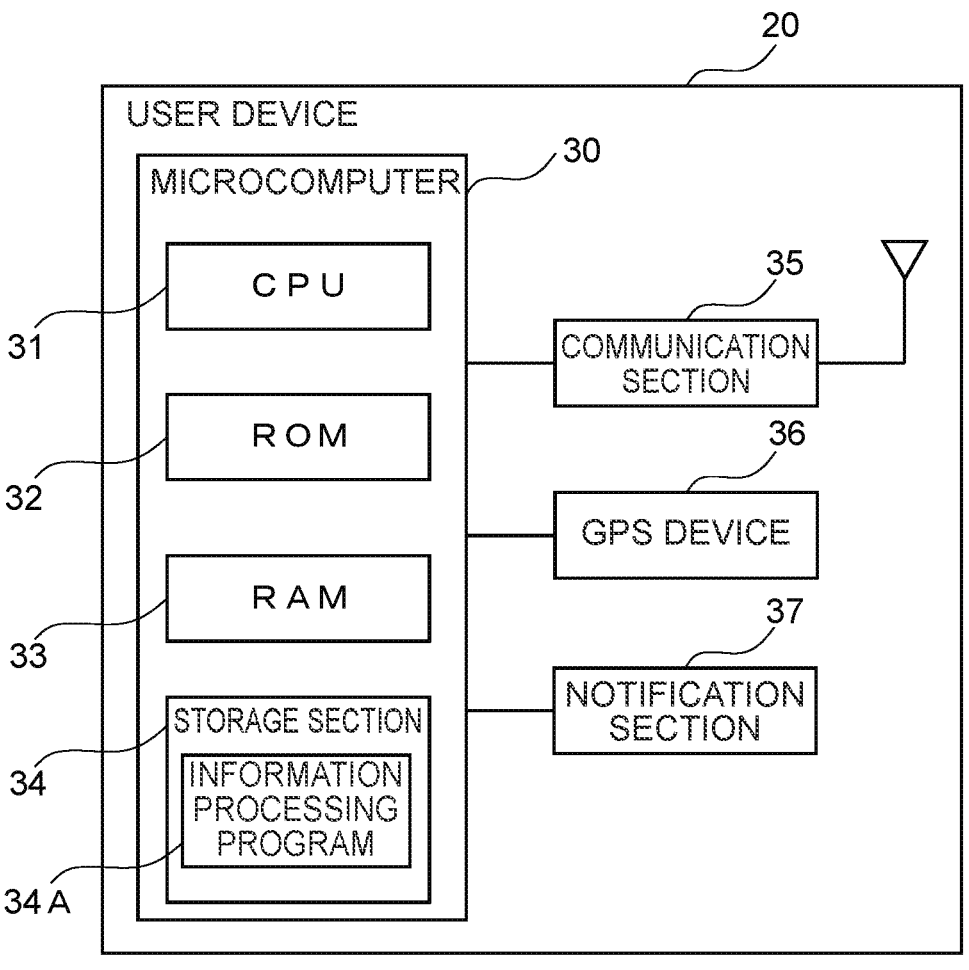
FIG. 2 is a block diagram illustrating a hardware configuration of a user device according to the present exemplary embodiment.

Next, description follows regarding a hardware configuration of the user device 20. FIG. 2 is a block diagram illustrating a hardware configuration of the user device 20.

As illustrated in FIG. 2, the user device 20 includes a microcomputer 30, a communication section 35, a GPS device 36, and a notification section 37.

The microcomputer 30 is configured including a central processing unit (CPU) 31, read only memory (ROM) 32, random access memory (RAM) 33, and a storage section 34.

The CPU 31 is a central processing unit that executes various programs, and controls each section. Namely, the CPU 31 reads a program from the ROM 32 or the storage section 34, and executes the program using the RAM 33 as workspace. The CPU 31 controls each configuration and performs various computation processing according to the program recorded on the ROM 32 or the storage section 34.

The ROM 32 is stored with various programs and various data. The RAM 33 functions as a workspace temporarily stored with a program and/or data.

The storage section 34 is configured by a storage device, such as an embedded Multi Media Card (eMMC) or Universal Flash Storage (UFS), and is stored with various programs and various data. An example of the various programs is an information processing program 34A stored in the storage section 34 to cause the CPU 31 to function as the functional configuration illustrated in FIG. 3, described later. An example of the various data is zone information that was transmitted from the server 40 and stored on the storage section 34 to represent the zones where a safety related action is urged to a user along a school route. Detailed explanation of the zone information is described later. Note that along a school route is an example of "along a path".

The communication section 35 is a wireless communication module for communication with the server 40 and the supervisor device 60. Such a wireless communication module may, for example, use a communication standard such as 5G, LTE, Wi-Fi (registered trademark) or the like. The communication section 35 is connected to the network N.

The GPS device 36 is a device that measures the current position of a user. The GPS device 36 includes a non-illustrated antenna to receive signals from GPS satellites. The current position of the user as measured by the GPS device 36 is stored on the storage section 34, associated with a measurement date and time of when the current position was measured, and also transmitted to the server 40.

The notification section 37 is a device that executes plural notifications urging a safety related action to a user moving along a school route. As an example, the notification section 37 executes such a notification using vibration and audio. There are plural types of notification pattern provided using vibration and audio by the notification section 37, and the notification section 37 executes notification with a notification pattern according to instruction by the CPU 31.

Next, description follows regarding a functional configuration of the user device 20.

Figure 3:
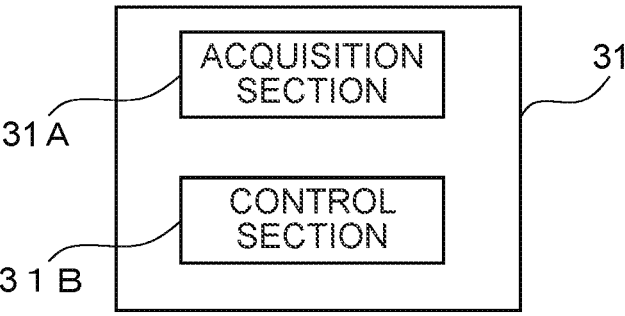
FIG. 3 is a block diagram illustrating an example of a functional configuration of a user device according to the present exemplary embodiment.

FIG. 3 is a block diagram illustrating an example of a functional configuration of the user device 20.

As illustrated in FIG. 3, the CPU 31 of the user device 20 includes, from a functional perspective, an acquisition section 31A and a control section 31B. Each of the functional configuration is implemented by the CPU 31 reading out and executing the information processing program 34A stored on the storage section 34. The CPU 31 is an example of a processor.

The acquisition section 31A acquires, from the server 40, zone information indicating zones along a school route where a safety related action is urged to a user. Examples of a safety related action include a confirmation action to confirm traffic safety and a retreat action to retreat from the current position. Examples of the zones along a school route where a safety related action is urged include a confirmation zone where a confirmation action is urged, and a retreat zone where a retreat action is urged.

The acquisition section 31A acquires, as zone information, position information indicating one or other out of the confirmation zone and the retreat zone referred to above. This position information is a specific zone along the school route, and the size of the zone differs according to the type of zone information. As an example of zone information, the acquisition section 31A acquires position information indicating a confirmation zone where a traffic accident has occurred in the past, position information indicating a retreat zone where a suspicious person has been sighted in the past, position information indicating a retreat zone having a high risk of a natural disaster, such as a landslide or tsunami, and position information indicating a confirmation zone or retreat zone stipulated by a supervisor of the user.

The zone information is of two types, zone information including time information related to a time when a concern with respect to user safety occurred in the past (hereafter referred to as "time related zone information"), and zone information not including such time information (hereafter referred to as "time unrelated zone information"). Such a concern with respect to user safety includes, as an example, a traffic accident, suspicious person sighting, natural disaster, and the like, and includes both incidents and accidents. For time related zone information, in addition to the position information indicating one or other out of a confirmation zone or retreat zone, the acquisition section 31A also acquires a date and time when a concern occurred in the past in the zone indicated by the position information.

In a case in which the current position of the user moving along a school route is contained in plurality of zones indicated by the zone information acquired by the acquisition section 31A, the control section 31B causes the notification section 37 to execute notification according to a zone having a high predetermined priority from among the plurality of zones.

In the first exemplary embodiment, the control section 31B causes the notification section 37 to execute a notification corresponding to a zone indicated by time related zone information (hereafter referred to as a "time related zone") from out of plurality of zones in priority over notification corresponding to a zone indicated by time unrelated zone information (hereafter referred to as a "time unrelated zone"). More specifically, the control section 31B causes the notification section 37 to execute any notifications corresponding to a time unrelated zone notification from out of the plurality of zones after causing the notification section 37 to execute any notifications corresponding to a time related zone.

In a case in which the current position of the user moving along a school route is contained in plural time related zones, the control section 31B causes the notification section 37 to execute notification corresponding to the zone, from out of the plural time related zones, in which the concern occurred at the most recent time as indicated by the time information.

Figure 4:
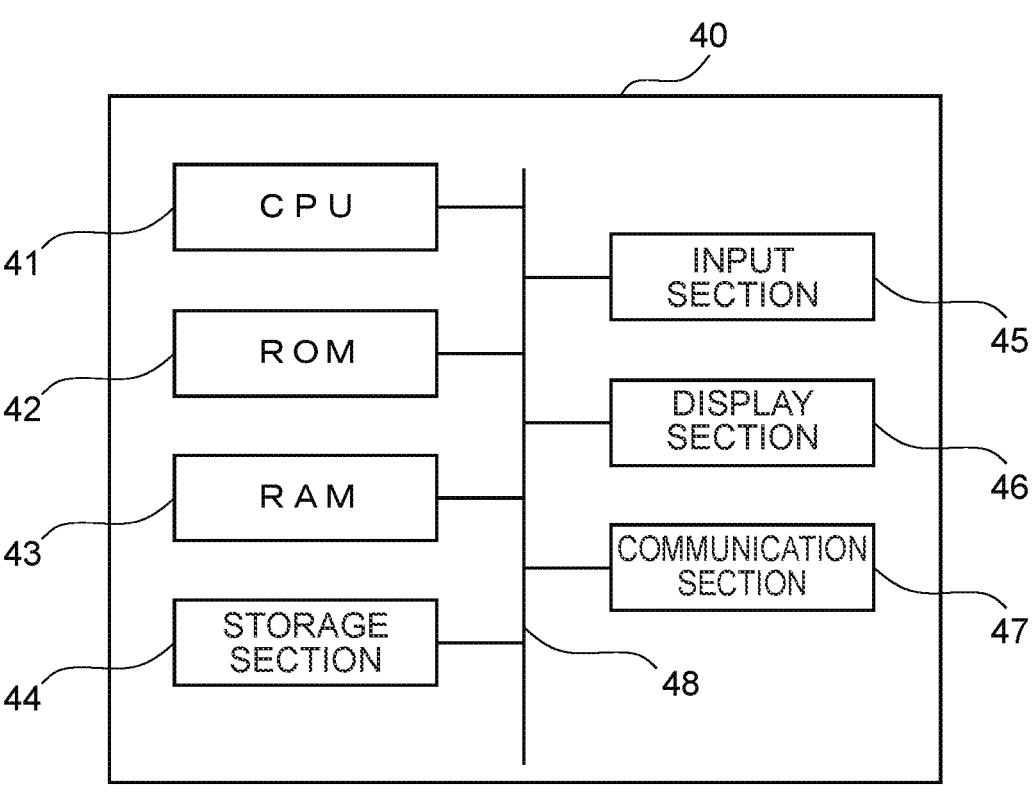
FIG. 4 is a block diagram illustrating a hardware configuration of a server according to the present exemplary embodiment.

Next, description follows regarding a hardware configuration of the server 40. FIG. 4 is a block diagram illustrating a hardware configuration of the server 40.

As illustrated in FIG. 4, the server 40 includes a CPU 41, ROM 42, RAM 43, a storage section 44, an input section 45, a display section 46, and a communication section 47. Each configuration is connected together through a bus 48 so as to be able to communicate with each other.

The CPU 41 is a central processing unit that executes various programs, and controls each section. Namely, the CPU 41 reads a program from the ROM 42 or the storage section 44, and executes the program using the RAM 43 as a workspace. The CPU 41 controls each configuration and performs various processing according to the program recorded on the ROM 42 or the storage section 44.

The ROM 42 is stored with various programs and various data. The RAM 43 functions as a workspace temporarily stored with a program and/or data.

The storage section 44 is configured by a storage device, such as a hard disk drive (HDD), solid state drive (SSD), or flash memory and is stored with various programs and various data.

The input section 45 includes a pointer device such as a mouse, a keyboard, a microphone, a camera, and the like and is employed to perform various input.

The display section 46 is, for example, a liquid crystal display, and displays various information. The display section 46 may also be a touch panel type display section that also functions as the input section 45.

The communication section 47 serves as an interface for communication with the user device 20 and the supervisor device 60. This communication may, for example, employ a wired communication standard such as Ethernet (registered trademark) or FDDI, or employ a wireless communication standard such as 4G, 5G, Bluetooth (registered trademark), or Wi-Fi (registered trademark). The communication section 47 is connected to the network N.

The CPU 41 of the server 40 periodically acquires, from a non-illustrated external device, position information indicating each zone along the school route including confirmation zones where a traffic accident has occurred in the past, retreat zones where a suspicious person has been sighted in the past, and retreat zones where there is a high risk of a natural disaster. The CPU 41 acquires from the supervisor device 60 position information indicating each zone along the school route including any confirmation zones and retreat zones stipulated by the supervisor of the user. The CPU 41 stores the acquired position information in the storage section 44 as time related zone information in a case in which the acquired position information includes time information, and stores the acquired position information in the storage section 44 as time unrelated zone information in a case in which the acquired position information did not include time information. The CPU 41 periodically transmits the time related zone information and the time unrelated zone information stored in the storage section 44 to the user device 20.

The CPU 41 also acquires the current position of the user and the measurement date and time of the current position from the user device 20. The CPU 41 stores the acquired user current position and current position measurement date and time in the storage section 44. The CPU 41 employs the current position of the user and current position measurement date and time stored in the storage section 44 to periodically generate a movement trace of the user along the school route, and transmits the generated user movement trace to the supervisor device 60.

Figure 5:
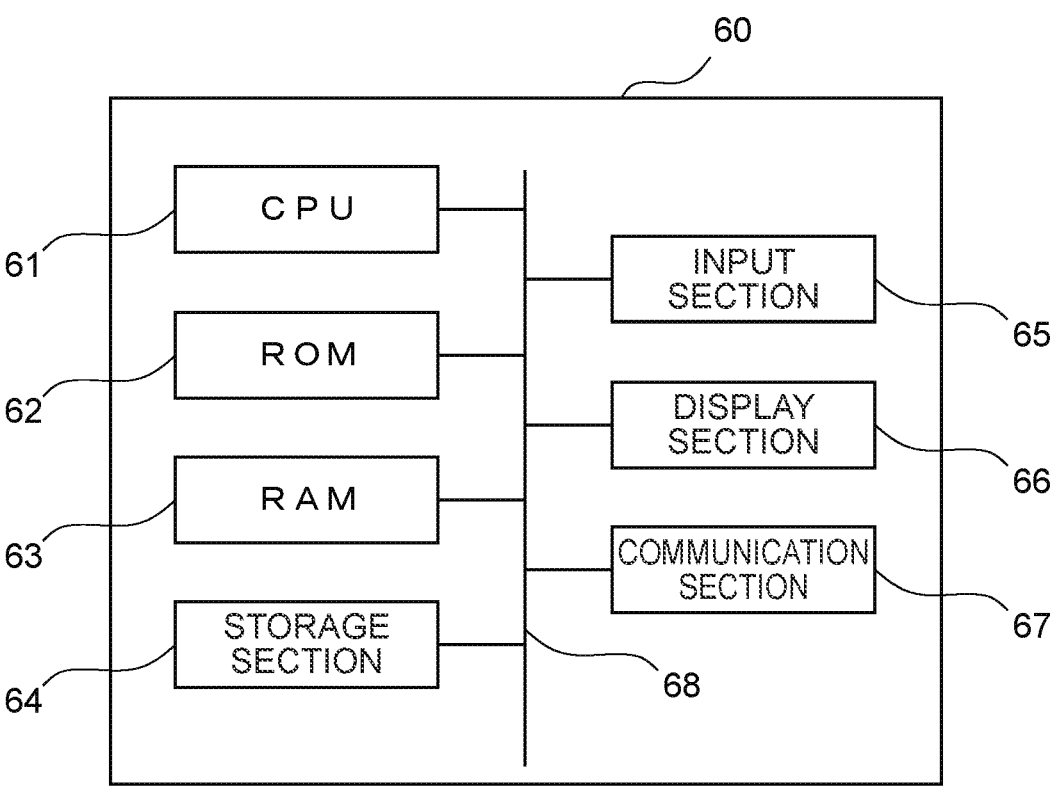
FIG. 5 is a block diagram illustrating a hardware configuration of a supervisor device according to the present exemplary embodiment.

Next, description follows regarding a hardware configuration of the supervisor device 60. FIG. 5 is block diagram illustrating a hardware configuration of the supervisor device 60.

As illustrated in FIG. 5, the supervisor device 60 includes a CPU 61, ROM 62, RAM 63, a storage section 64, an input section 65, a display section 66, and a communication section 67. Each configuration is connected together through a bus 68 so as to be able to communicate with each other.

The CPU 61 is a central processing unit that executes various programs, and controls each section. Namely, the CPU 61 reads a program from the ROM 62 or the storage section 64, and executes the program using the RAM 63 as a workspace. The CPU 61 controls each configuration and performs various processing according to the program recorded on the ROM 62 or the storage section 64.

The ROM 62 stores various programs and various data. The RAM 63 functions as a workspace temporarily stored with a program and/or data.

The storage section 64 is configured from a storage device, such as an eMMC or a UFS, and is stored with various programs and various data.

The input section 65 includes various buttons, a microphone, a camera, and the like, and is employed to perform various input.

The display section 66 is, for example, an liquid crystal display, and displays various information. The display section 66 may be a touch panel type display section that also functions as the input section 65.

The communication section 67 is a wireless communication module for communication with the user device 20 and the server 40. This wireless communication module employs, for example, a communication standard such as 5G, LTE, or Wi-Fi (registered trademark). The communication section 67 is connected to the network N.

The CPU 61 of the supervisor device 60 requests the server 40 to provide a user movement trace along the school route. The CPU 61 displays the acquired user movement trace on the display section 66.

The CPU 61 receives stipulation by a supervisor of confirmation zones and retreat zones along the school route. The CPU 61 transmits position information indicating any received stipulated confirmation zones and retreat zones to the server 40.

Figure 6:
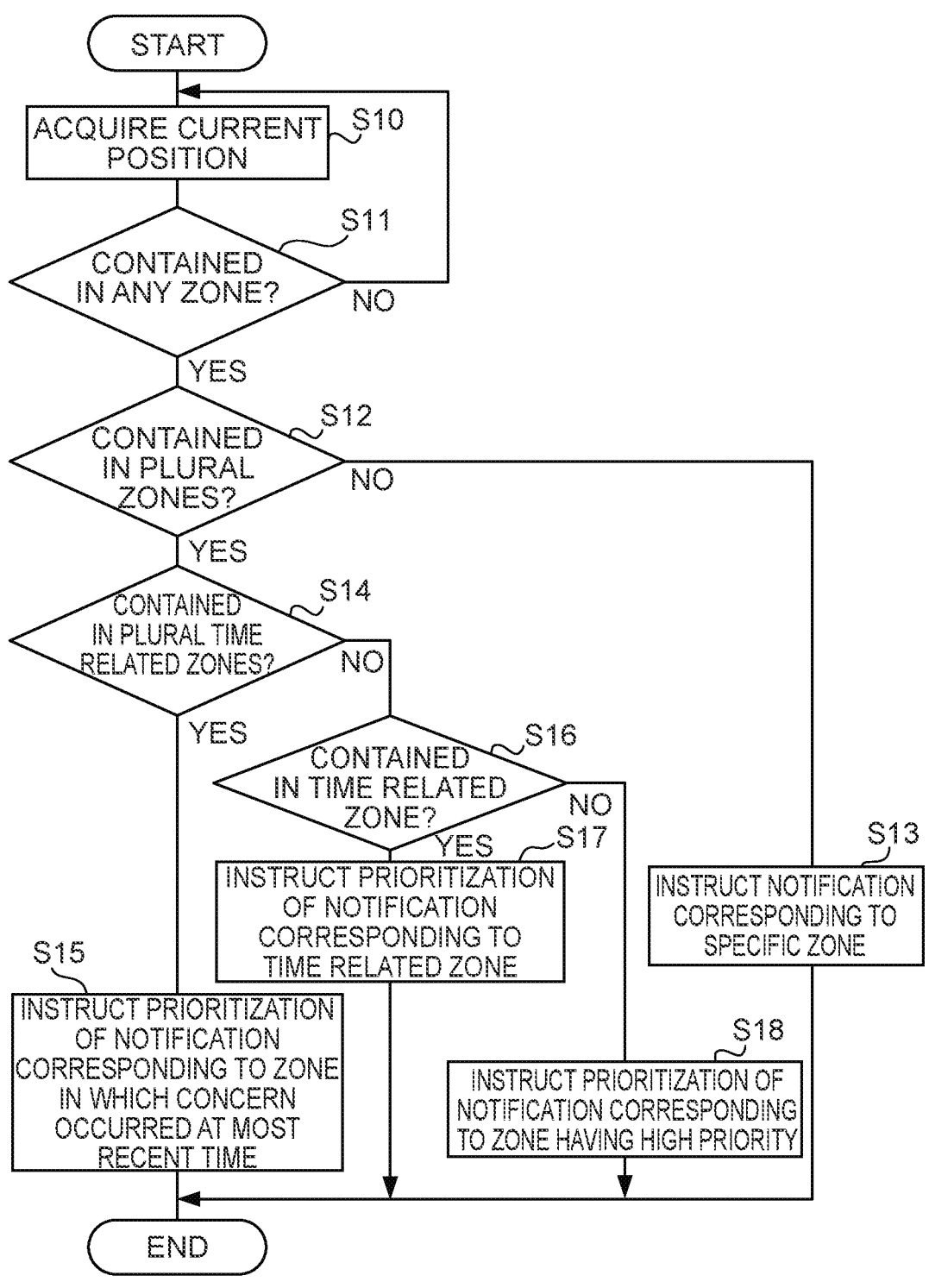
FIG. 6 is a first flowchart illustrating a flow of decision processing according to the present exemplary embodiment.

FIG. 6 is a first flowchart illustrating a flow of decision processing to decide the notification the user device 20 causes the notification section 37 to execute. The CPU 31 reads the information processing program 34A from the storage section 34, expands the information processing program 34A in the RAM 33, and performs the decision processing.

At step S10 illustrated in FIG. 6, the CPU 31 acquires the current position of the user as measured by the GPS device 36. Processing then proceeds to step S11.

At step S11, the CPU 31 determines whether or not the current position of the user acquired at step S10 is contained in any of the zones indicated by the zone information acquired from the server 40, and processing proceeds to step S12 in a case in which determination is that the current position is contained therein (step S11: YES). However, processing returns to step S10 in a case in which determination by the CPU 31 is that the current position of the user is not contained in any of the zones indicated by this zone information (step S11: NO).

At step S12, the CPU 31 determines whether or not the current position of the user acquired at step S10 is contained in plurality of zones indicated by the zone information acquired from the server 40, and processing proceeds to step S14 in a case in which determination is that the current position is contained therein (step S12: YES). However, processing proceeds to step S13 in a case in which determination by the CPU 31 is that the current position of the user is not contained in plurality of zones indicated by this zone information (step S12: NO).

At step S13, the CPU 31 instructs the notification section 37 to notify a specific zone, in this case a zone determined at step S11 as containing the current position of the user as indicted by the zone information. As a result, the notification section 37 executes a notification corresponding to this specific zone. The decision processing is then ended.

At step S14, the CPU 31 determines whether or not the current position of the user acquired at step S10 is contained in plural time related zones, and processing proceeds to step S15 in a case in which the current position of the user is determined to be contained therein (step S14: YES). However, processing proceeds to step S16 in a case in which the current position of the user is determined by the CPU 31 to not be contained in plural time related zones (step S14: NO).

At step S15, the CPU 31 instructs the notification section 37 to prioritize notification corresponding to the time related zone having the most recent time a concern occurred as indicated by the time information from among the plural time related zones over other notifications. As a result thereof, the notification section 37 executes the notification corresponding to the time related zone having the most recent time a concern occurred as indicated by the time information as a priority over the other notifications. The decision processing is then ended.

At step S16, the CPU 31 determines whether or not the current position of the user acquired at step S10 is contained in a time related zone, and processing proceeds to step S17 in a case in which the current position of the user is determined to be contained therein (step S16: YES). However, processing proceeds to step S18 in a case in which the current position of the user is determined by the CPU 31 not to be contained in a time related zone (step S16: NO).

At step S17, the CPU 31 instructs the notification section 37 so as to prioritize notification corresponding to the time related zone from out of the plurality of zones over other notifications. As a result thereof, the notification section 37 executes the notification corresponding to this time related zone in priority over the other notifications. The decision processing is then ended.

At step S18, the CPU 31 instructs the notification section 37 so as to prioritize notification corresponding to a zone having a high priority from among the plurality of zones over other notifications. As a result thereof, the notification section 37 executes the notification corresponding to this high priority zone in priority over the other notifications. The decision processing is then ended.

Figure 7:
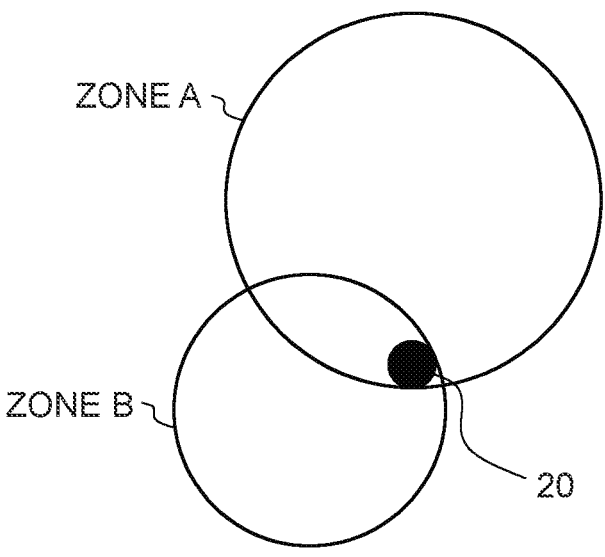
FIG. 7 is a first explanatory diagram to explain a specific example of prioritization control according to the present exemplary embodiment.

Next description follows regarding a specific example of prioritization control in the first exemplary embodiment, with reference to FIG. 7, for a case in which the CPU 31 causes the notification section 37 to prioritize execution of notification corresponding to one or other zone when the current position of the user moving along the school route is contained in plurality of zones as indicated by the zone information.

FIG. 7 illustrates a zone A and a zone B serving as plurality of zones indicated by the zone information. As an example, the zone A is a confirmation zone where a traffic accident occurred in the past, and zone B is a confirmation zone stipulated by the supervisor along the school route. The zone A is a time related zone, and the zone B is a time unrelated zone. In this case, when the user device 20 is present at a position contained in the zone A and the zone B as illustrated in FIG. 7, the CPU 31 of the user device 20 causes the notification section 37 to execute notification corresponding to the zone A that is a time related zone from out of the zone A and the zone B in priority over notification corresponding to the zone B that is a time unrelated zone. Note that the example described above is a case in which the user is moving diagonally upward toward the left from the lower right in FIG. 7, and the current position of the user is contained in both the zone A and the zone B at the same time. However, the CPU 31 performs the following control, for example, in a case in which the current position of the user moves upward from the bottom in FIG. 7 and the current position of the user becomes contained in both the zone A and the zone B after first being contained in the zone B alone. In such a case, the CPU 31 causes the notification section 37 to execute notification corresponding to the zone B while the current position of the user is contained in the zone B alone, and then causes the notification section 37 to execute notification corresponding to zone A in priority over notification corresponding to the zone B after the current position of the user becomes contained in both the zone A and the zone B.

Next, description follows regarding another specific example in which zone A is a confirmation zone where a traffic accident occurred in the past, and zone B is a retreat zone where a suspicious person was sighted in the past. Zone A is a time related zone where a traffic accident occurred one week prior to the current date and time. The zone B is a time related zone where a suspicious person was sighted three days prior to the current date and time. In such a case, when the user device 20 is present at a position contained in both the zone A and the zone B as illustrated in FIG. 7, the CPU 31 of the user device 20 causes the notification section 37 to execute notification corresponding to the zone B that is the time related zone in which the concern occurred at a most recent time as indicated by the time information from among the zone A and the zone B in priority over the notification corresponding to the zone A.

As described above, in the user device 20 the CPU 31 acquires the zone information indicating zones along the school route where a safety related action is to be urged to a user. In a case in which the current position of the user moving along the school route is contained in plurality of zones as indicated by the acquired zone information, the CPU 31 then causes the notification section 37 to execute notification corresponding to the zone from out of the plurality of zones having a high predetermined priority. Thereby this user device 20 enables the specific notification to be executed in priority over another notification in a case in which there are plural executable notifications urging a safety related action to the user moving along the school route.

Moreover, in the user device 20, the CPU 31 causes the notification section 37 to execute notification corresponding to a time related zone from out of the plurality of zones in priority over notification corresponding to time unrelated zones. Thereby this user device 20 enables the notification corresponding to a zone having high reliability containing the time the concern occurred in the past to be executed in priority over another notification in a case in which there are plural executable notifications urging a safety related action to the user moving along a school route.

Moreover, in the user device 20, the CPU 31 causes the notification section 37 to execute notification corresponding to the zone in which a concern occurred at the most recent time as indicated by the time information from among plural time related zones in a case in which the current position of the user moving along the school route is contained in plural time related zones. Thereby the user device 20 is able to execute notification corresponding to a zone with a high reliability having the freshest information in priority over other notifications in a case in which there are plural executable notifications urging a safety related action to a user moving along a school route.

Moreover, in the user device 20, a time related zone is a zone where a concern occurred within a specific period of time, for example within one week, prior to the current date and time. Thereby, this user device 20 enables avoidance of a situation in which the notification corresponding to a time related zone that is older than the specific period of time prior to the current date and time is executed in priority over another notification.

Second Exemplary Embodiment

Next, description follows regarding a second exemplary embodiment of the information processing system 10 according to the present exemplary embodiments, with duplicate explanation of parts thereof common to other exemplary embodiments either abbreviated or omitted.

In the second exemplary embodiment the time related zone is a zone in which a concern occurred during a time band of around a specific period of time, for example a time band of around an hour, in the past from the current date and time. Thereby this user device 20 enables avoidance of a situation in which a notification corresponding to a time related zone exceeding around the specific period of time from the current date and time is executed in priority over another notification.

Third Exemplary Embodiment

Next, a description follows regarding a third exemplary embodiment of the information processing system 10 according to the present exemplary embodiments, with duplicate explanation of parts thereof common to other exemplary embodiments either abbreviated or omitted.

Figure 8:
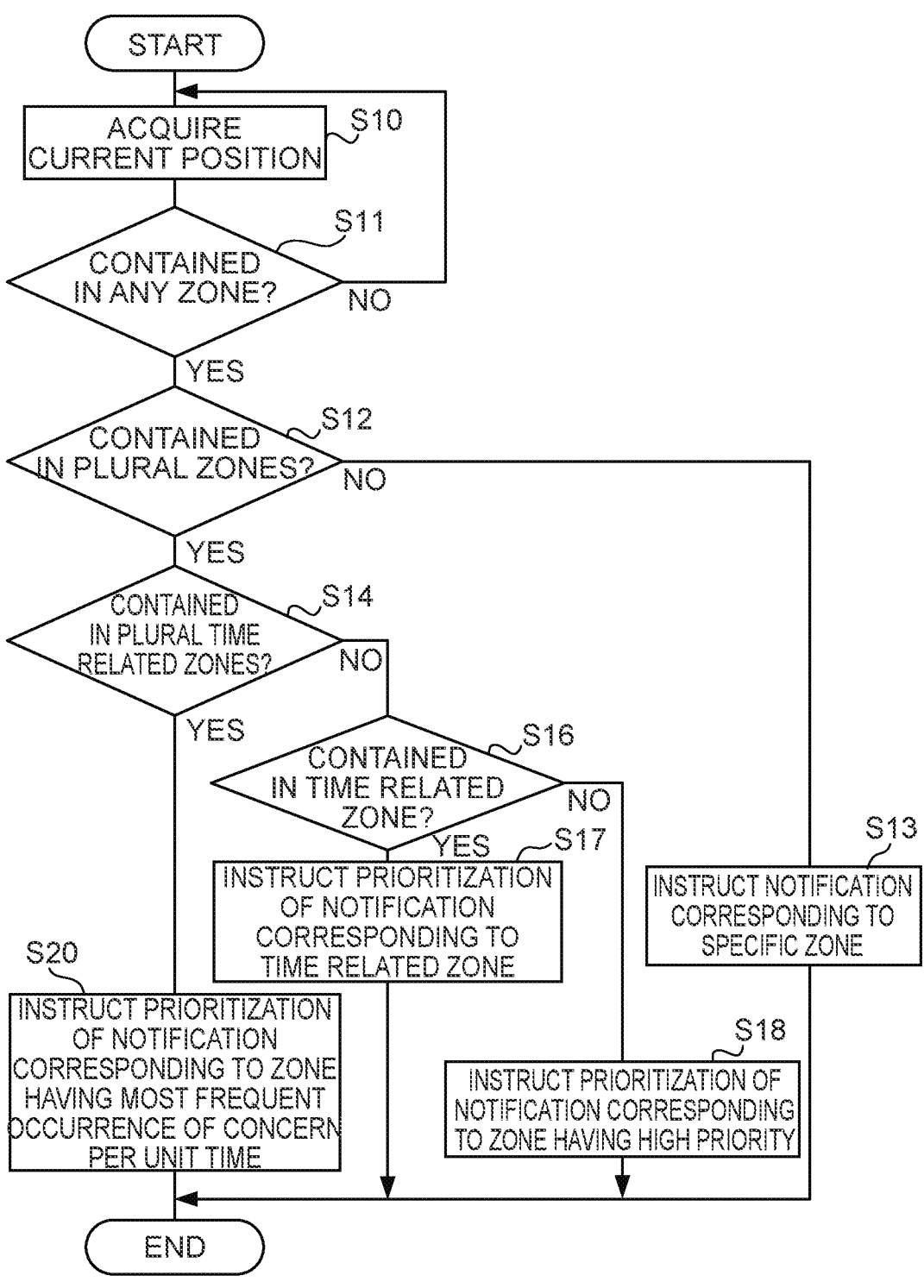
FIG. 8 is a second flowchart illustrating a flow of decision processing according to the present exemplary embodiment.

FIG. 8 is a second flowchart illustrating a flow of decision processing. Note that the processing for each step other than step S20 proceeded to from YES at step S14 in the flowchart illustrating in FIG. 8 is similar to that in the flowchart illustrated in FIG. 6, and so duplicate explanation thereof will be abbreviated or omitted.

At step S14 illustrated in FIG. 8, the CPU 31 determines whether or not the current position of the user acquired at step S10 is contained in plural time related zones, and processing proceeds to step S20 when determined to be contained therein (step S14: YES). However, processing proceeds to step S16 in a case in which the current position of the user is determined by the CPU 31 to not be contained in plural time related zones (step S14: NO).

At step S20 the CPU 31 instructs the notification section 37 so as to prioritize notification corresponding to the time related zone having the most frequent occurrence of a concern per unit time from among the plural time related zones over other notifications. As a result thereof, the notification section 37 executes the notification corresponding to the time related zone having the most frequent occurrence of a concern per unit time in priority over other notifications. The decision processing is then ended.

Next, description follows regarding a specific example of prioritization control in the third exemplary embodiment, with reference to FIG. 7.

In FIG. 7, zone A is a confirmation zone in which a traffic accident occurred in the past, and zone B is a retreat zone in which a suspicious person was sighted in the past. Zone A is a time related zone in which a traffic accident has occurred five times per unit time, for example per 72 hours. The zone B is a time related zone in which a suspicious person has been sighted three times per 72 hours. In such cases, when the user device 20 is present at a position contained in both the zone A and the zone B illustrated in FIG. 7, the CPU 31 of the user device 20 causes the notification section 37 to execute notification corresponding to the zone A which is the time related zone having the most frequent occurrence of a concern per 72 hours from out of the zone A and the zone B, in priority over notification corresponding to the zone B.

As described above, in a case in which the current position of the user moving along a school route is contained in plural time related zones, the CPU 31 in the user device 20 functions as the control section 31B to cause the notification section 37 to execute notification corresponding to a zone having the most frequent occurrence of a concern per unit time from among plural time related zones. Thereby this user device 20 is able to cause the execution of the notification corresponding to a zone with a high reliability having the most frequent occurrences of the concern per unit time to be executed in priority over other notifications in a case in which there are plural executable notifications urging a safety related action to a user moving along a school route.

Fourth Exemplary Embodiment

Next, description follows regarding a fourth exemplary embodiment of the information processing system 10 according to the present exemplary embodiments, with description of common parts to other exemplary embodiments either abbreviated or omitted.

Figure 9:
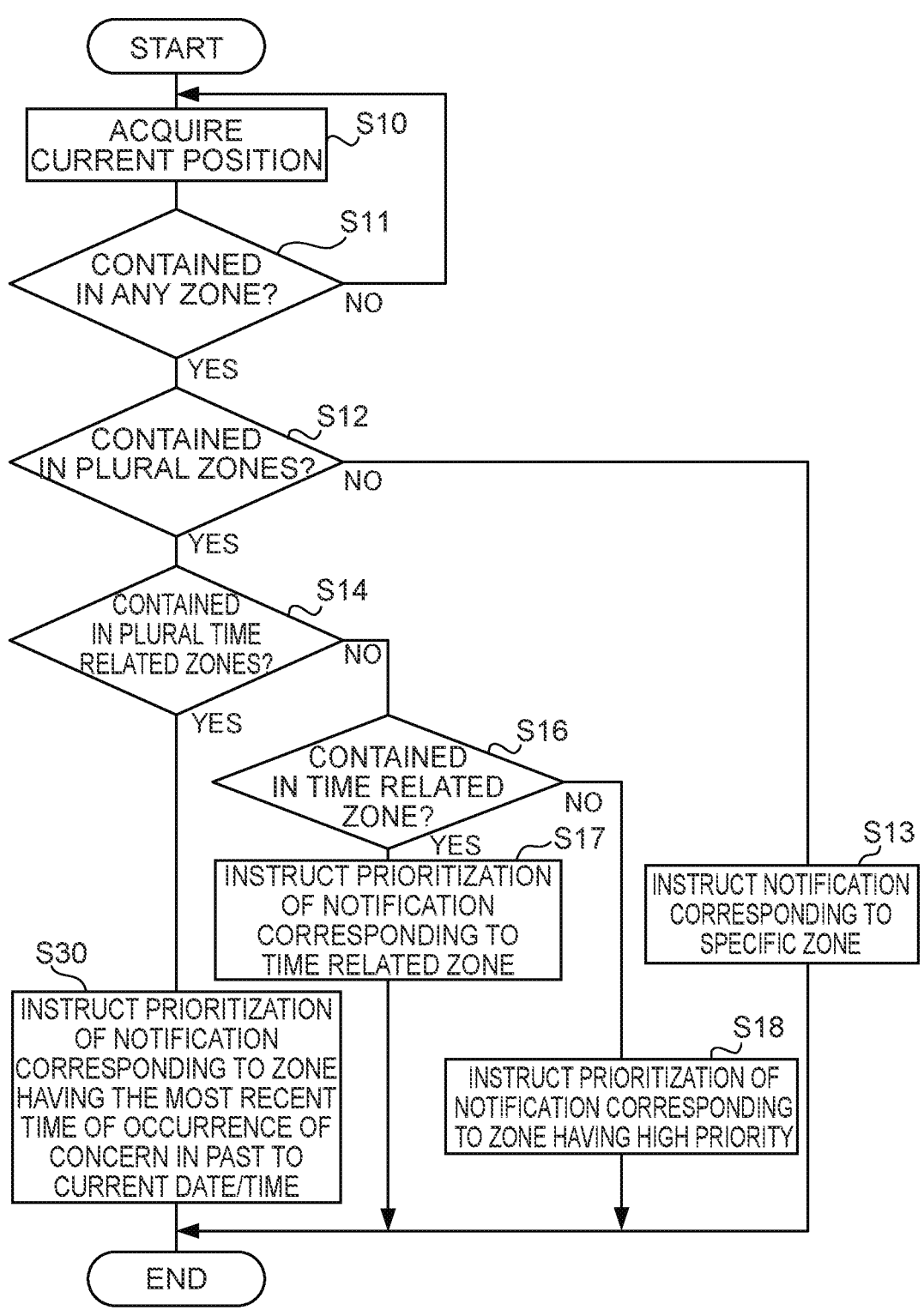
FIG. 9 is a third flowchart illustrating a flow of decision processing according to the present exemplary embodiment.

FIG. 9 is a third flowchart illustrating a flow of decision processing. Note that processing of each step other than step S30 proceeded to from YES at step S14 in the flowchart illustrated in FIG. 9 is similar to that of the flowchart illustrated in FIG. 6, and so duplicate explanation thereof will be abbreviated or omitted.

At step S14 illustrated in FIG. 9, the CPU 31 determines whether or not the current position of the user acquired at step S10 is contained in plural time related zones, and processing proceeds to step S30 when determined to be contained therein (step S14: YES). However, processing proceeds to step S16 in a case in which the current position of the user is determined by the CPU 31 to not be contained in plural time related zones (step S14: NO).

At step S30, the CPU 31 instructs the notification section 37 so as to prioritize a notification corresponding to the time related zone having the most recent time of occurrence of a concern in the past to the current date and time from among plural time related zones, over other notifications. As a result thereof, the notification section 37 executes notification corresponding to this time related zone in priority over other notifications. The decision processing is then ended.

Next, description follows regarding a specific example of prioritization control in the fourth exemplary embodiment, with reference to FIG. 7.

FIG. 7 illustrates a zone A that is a confirmation zone in which a traffic accident occurred in the past, and a zone B that is a retreat zone in which a suspicious person has been sighted in the past. Zone A is a time related zone in which a traffic accident has occurred in the past within a time band of one hour prior to the current date and time. Zone B is a time related zone in which a suspicious person has been sighted in a time band of eight hours later from the current date and time. In such a case, when the user device 20 is present at a position contained in both the zone A and the zone B illustrated in FIG. 7, the CPU 31 of the user device 20 causes the notification section 37 to execute notification corresponding to zone A, which is the time related zone having the most recent occurrence time of a concern in the past to the current date and time from among the zone A and the zone B, in priority over notification corresponding to the zone B.

As described above, the CPU 31 in the user device 20 functions as the control section 31B, and in a case in which the current position of a user moving along a school route is contained in plural time related zones, the CPU 31 causes the notification section 37 to execute notification corresponding to a zone having the most recent occurrence time of a concern in the past to the current date and time from among the plural time related zones. Thereby this user device 20 enables the notification corresponding to the zone with a high reliability having the most recent time of occurrence of the concern in the past to the current date and time to be executed in priority over another notification in a case in which there are plural executable notifications urging a safety related action to the user moving along a school route.

Fifth Exemplary Embodiment

Next, description follows regarding a fifth exemplary embodiment of the information processing system 10 according to the present exemplary embodiments, with description of common parts to other exemplary embodiments either abbreviated or omitted.

In the fifth exemplary embodiment, the control section 31B performs periodic control to cause the notification section 37 to execute notification corresponding to a retreat zone (hereafter referred to as a "retreat notification") in a case in which the current position of a user moving along a school route is contained in a retreat zone.

Figure 10:
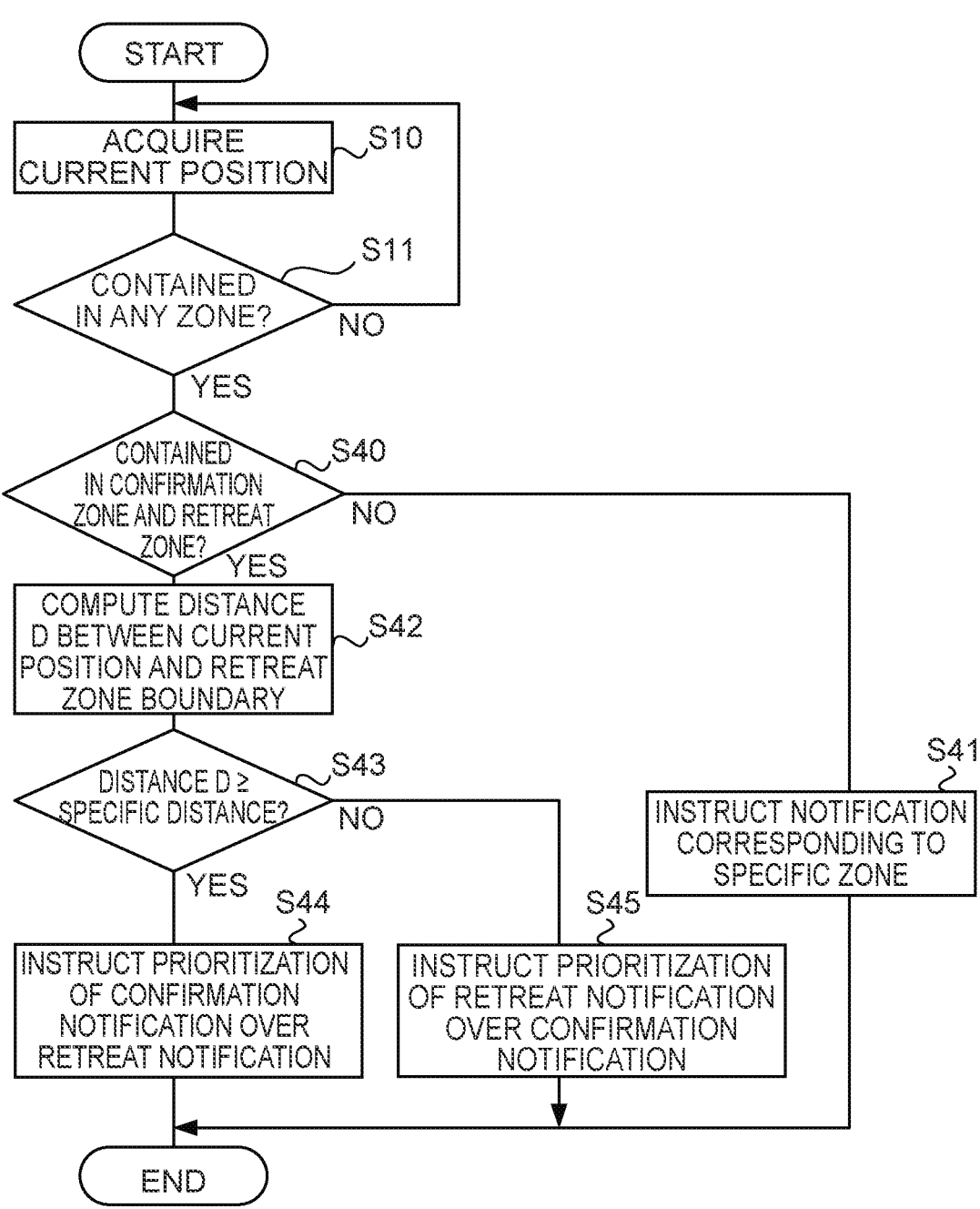
FIG. 10 is a fourth flowchart illustrating a flow of decision processing according to the present exemplary embodiment.

FIG. 10 is a fourth flowchart illustrating a flow of decision processing. Note that processing of step S10 and step S11 in the flowchart illustrated in FIG. 10 is similar to that in the flowchart illustrated in FIG. 6, and so description thereof will be either omitted or abbreviated.

At step S11 illustrated in FIG. 10, the CPU 31 determines whether or not the current position of the user acquired at step S10 is contained in any of the zones indicated by the zone information acquired from the server 40, and processing proceeds to step S40 in a case in which determination is that the current position is contained therein (step S11: YES). However, processing returns to step S10 in a case in which determination by the CPU 31 is that the current position of the user is not contained in any of the zones indicated by this zone information (step S11: NO).

At step S40, the CPU 31 determines whether or not the current position of the user acquired at step S10 is contained in confirmation zones and retreat zones indicated by the zone information acquired from the server 40, and processing proceeds to step S42 when determined to be contained therein (step S40: YES). However, processing proceeds to step S41 in a case in which the current position of the user is determined by the CPU 31 as not being contained in the confirmation zones and the retreat zones indicated by this zone information (step S40: NO).

At step S41, the CPU 31 instructs the notification section 37 to executed notification corresponding to a specific zone. As a result thereof, the notification section 37 executes notification corresponding to this specific zone. The decision processing is then ended. In a case in which the current position of the user acquired at step S10 is contained in a single zone indicated by the zone information acquired from the server 40, the CPU 31 instructs the notification section 37 to execute notification corresponding to this single zone. In a case in which the current position of the user acquired at step S10 is contained in plurality of zones indicated by the zone information acquired from the server 40, the CPU 31 instructs the notification section 37 so as to execute notification corresponding to a zone having a high priority from among the plurality of zones in priority over other notifications.

At step S42, the CPU 31 computes a distance D between the current position of the user acquired at step S10 and a boundary of a retreat zone. Processing then proceeds to step S43.

At step S43, the CPU 31 determines whether or not the distance D computed at step S42 is a specific distance or greater, and processing proceeds to step S44 in a case in which the distance D is determined to be the specific distance or greater (step S43: YES). However, processing proceeds to step S45 in a case in which the distance D is determined by the CPU 31 to not be the specific distance or greater (step S43: NO).

At step S44 the CPU 31 instructs the notification section 37 so as to prioritize notification corresponding to the confirmation zone (hereafter referred to as "confirmation notification") in priority over retreat notification. As a result thereof, the notification section 37 executes confirmation notification in priority over retreat notification. The decision processing is then ended.

At step S45, the CPU 31 instructs the notification section 37 so as to prioritize retreat notification over confirmation notification. As a result thereof, the notification section 37 executes retreat notification in priority over confirmation notification. The decision processing is then ended.

Figure 11:
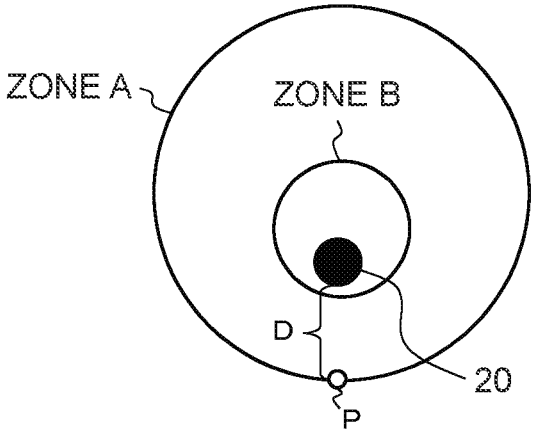
FIG. 11 is a second explanatory diagram to explain a specific example of prioritization control according to the present exemplary embodiment.

Next, description follows regarding a specific example of prioritization control in the fifth exemplary embodiment, with reference to FIG. 11.

FIG. 11 illustrates a zone A and a zone B serving as a confirmation zone and a retreat zone as indicated by zone information. As an example, the zone A is a retreat zone in which a suspicious person was sighted in the past, and the zone B is a confirmation zone stipulated by the supervisor along the school route.

The current position of the user device 20 illustrated in FIG. 11 is at a distance D away from a point of entry P to the zone A, namely away from a boundary of the zone A. When the distance D is a specific distance or greater in such cases, the CPU 31 of the user device 20 instructs the notification section 37 so as to prioritize confirmation notification over retreat notification. However, in a case in which the distance D is not the specific distance or greater, the CPU 31 instructs the notification section 37 so as to prioritize retreat notification over confirmation notification.

As described above, the CPU 31 in the user device 20 functions as the control section 31B so as to cause the notification section 37 to execute retreat notification in priority over confirmation notification in a case in which the current position of a user moving along a school route is contained in both a confirmation zone and a retreat zone. Thereby this user device 20 enables the user to be urged to retreat from a dangerous site along the school route by executing the retreat notification in priority over the confirmation notification in a case in which there are plural executable notifications urging a safety related action to the user moving along the school route.

Moreover, the CPU 31 in the user device 20 functions as the control section 31B so as to cause the notification section 37 to execute confirmation notification in priority over retreat notification in a case in which the current position of a user moving along a school route is contained in both a confirmation zone and a retreat zone and is a specific distance or greater away from a boundary of the retreat zone. Thereby this user device 20 enables the confirmation notification to be executed by the notification section 37 in priority over the retreat notification in a case in which the user can be assumed to be dawdling in the retreat zone intentionally.

Sixth Exemplary Embodiment

Next, description follows regarding a sixth exemplary embodiment of the information processing system 10 according to the present exemplary embodiments, with description of common parts to other exemplary embodiments either abbreviated or omitted.

In the sixth exemplary embodiment, similarly to in the fifth exemplary embodiment, the control section 31B performs periodic control to cause the notification section 37 to execute retreat notification in a case in which the current position of a user moving along a school route is contained in a retreat zone.

Figure 12:
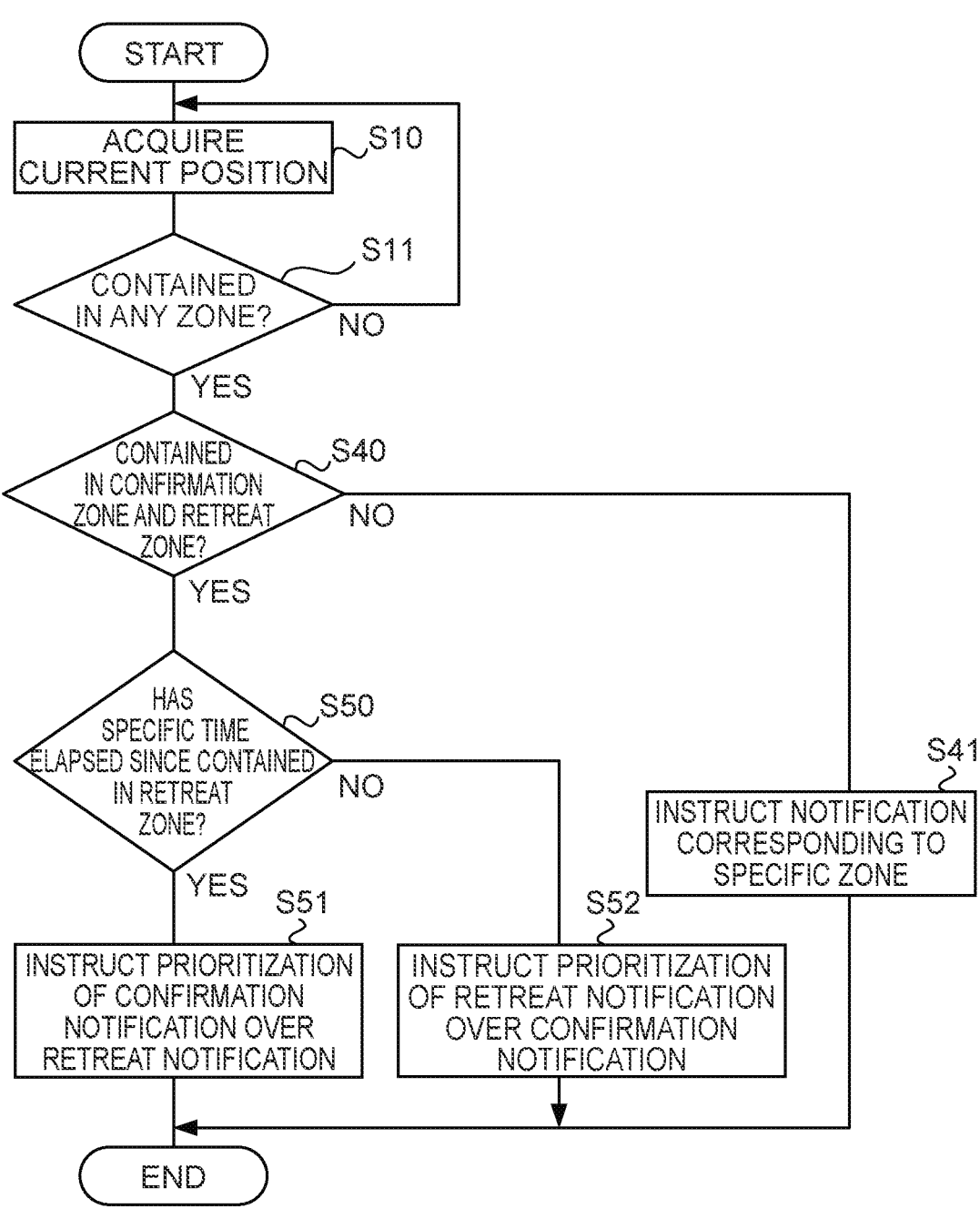
FIG. 12 is a fifth flowchart illustrating a flow of decision processing according to the present exemplary embodiment.

FIG. 12 is a fifth flowchart illustrating a flow of decision processing. Note that the processing at step S10, step S11, step S40, and step S41 in the flowchart illustrated in FIG. 12 is similar to that in the flowchart illustrated in FIG. 10, and so description will be omitted or abbreviated thereof.

At step S40 illustrated in FIG. 12, the CPU 31 determines whether or not the current position of the user acquired at step S10 is contained in confirmation zones and retreat zones indicated by the zone information acquired from the server 40, and processing proceeds to step S50 when determined to be contained therein (step S40: YES). However, processing proceeds to step S41 in a case in which the current position of the user is determined by the CPU 31 as not being contained in the confirmation zones and the retreat zones indicated by this zone information (step S40: NO).

At step S50, the CPU 31 determines whether or not a specific period of time has elapsed since the current position of the user acquired at step S10 was contained in a retreat zone, and processing proceeds to step S51 in a case in which the specific period of time is determined to have elapsed (step S50: YES). However, processing proceeds to step S52 in a case in which determination by the CPU 31 is that the specific period of time has not elapsed since when the current position of the user was contained in a retreat zone (step S50: NO).

At step S51, the CPU 31 instructs the notification section 37 so as to prioritize confirmation notification over retreat notification. As a result thereof, the notification section 37 executes confirmation notification in priority over retreat notification. The decision processing is then ended.

At step S52, the CPU 31 instructs the notification section 37 so as to prioritize retreat notification over confirmation notification. As a result thereof, the notification section 37 executes retreat notification in priority over confirmation notification. The decision processing is then ended.

Figure 13:
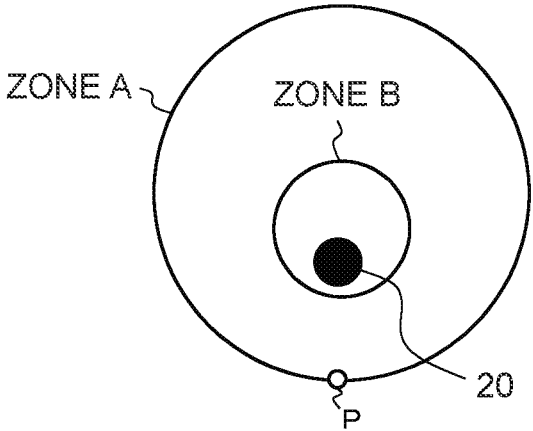
FIG. 13 is a third explanatory diagram to explain a specific example of prioritization control according to the present exemplary embodiment.

Next, description follows regarding a specific example of prioritization control in the sixth exemplary embodiment, with reference to FIG. 13.

FIG. 13 illustrates a zone A and a zone B serving as a confirmation zone and a retreat zone as indicated by zone information. As an example, the zone A is a retreat zone in which a suspicious person was sighted in the past, and the zone B is a confirmation zone stipulated by the supervisor along the school route.

In a state in which the user device 20 is present at a position contained in both the zone A and the zone B illustrated in FIG. 13, consider a situation in which a specific period of time has not elapsed since the user carrying the user device 20 entered the zone A. In such cases the CPU 31 of the user device 20 instructs the notification section 37 so as to prioritize retreat notification over confirmation notification. However, in a state in which the user device 20 is present at a position contained in both the zone A and the zone B illustrated in FIG. 13 and the specific period of time has elapsed since the user carrying the user device 20 entered the zone A, the CPU 31 instructs the notification section 37 so as to prioritize confirmation notification over retreat notification.

As described above, in the user device 20, the CPU 31 functions as the control section 31B to cause the notification section 37 to execute confirmation notification in priority over retreat notification in a case in which the current position of a user moving along a school route is contained in both a confirmation zone and a retreat zone and a specific period of time has elapsed since being contained in a retreat zone. Thereby this user device 20 enables the confirmation notification to be executed by the notification section 37 in priority over the retreat notification in a case in which the user can be assumed to be dawdling in the retreat zone intentionally.

Seventh Exemplary Embodiment

Next, description follows regarding a seventh exemplary embodiment of the information processing system 10 according to the present exemplary embodiments, with description of common parts to other exemplary embodiments either abbreviated or omitted.

In the seventh exemplary embodiment, similarly to in the fifth exemplary embodiment and the sixth exemplary embodiment, the control section 31B performs periodic control to cause the notification section 37 to execute retreat notification in a case in which the current position of a user moving along a school route is contained in a retreat zone.

Figure 14:
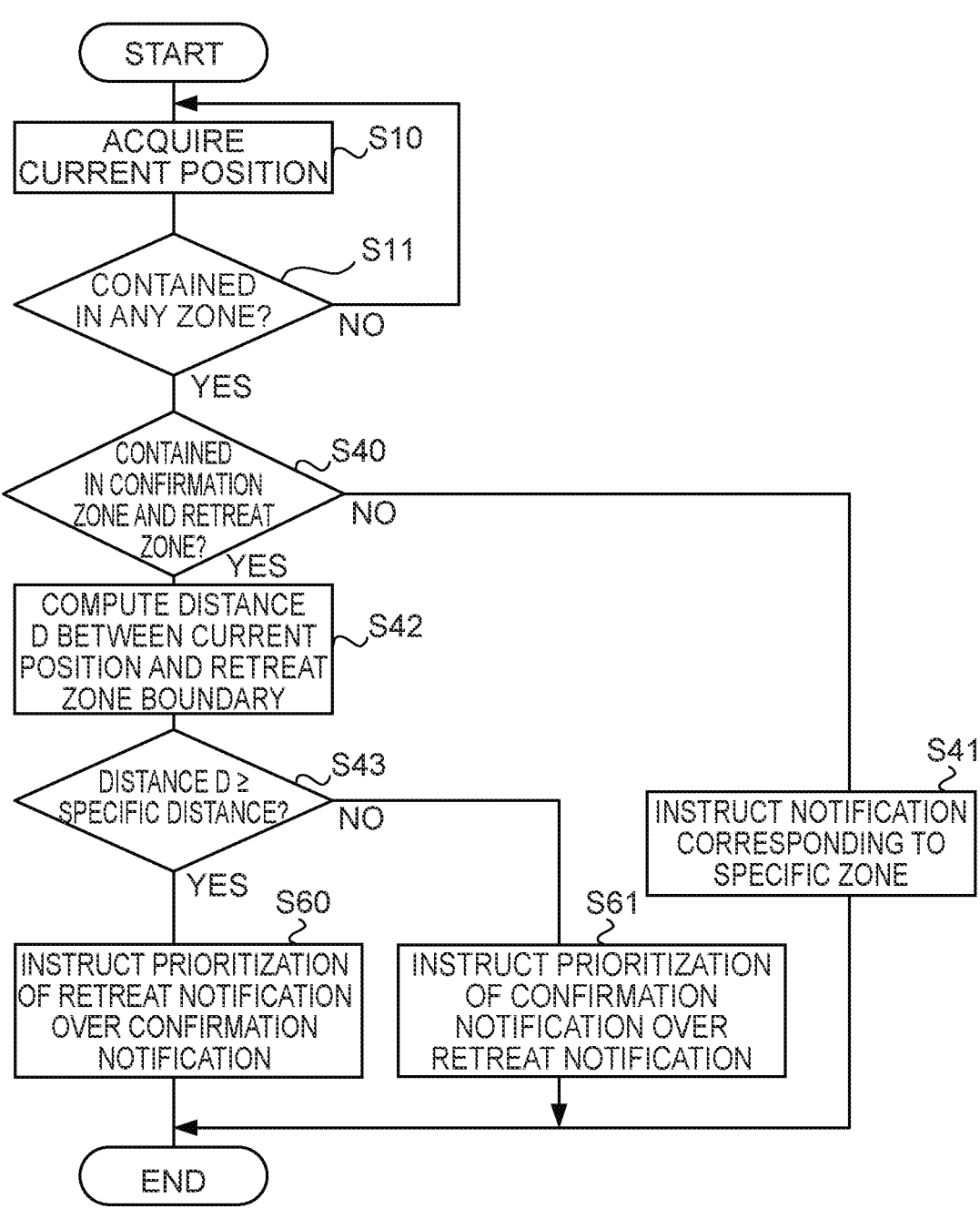
FIG. 14 is a sixth flowchart illustrating a flow of decision processing according to the present exemplary embodiment.

FIG. 14 is a sixth flowchart illustrating a flow of decision processing. Note that processing of each step other than step S60 and step S61 proceeded to from step S43 in the flowchart of FIG. 14 is similar to that of the flowchart illustrated in FIG. 10, and so duplicate explanation thereof will be abbreviated or omitted.

At step S43 illustrated in FIG. 14, the CPU 31 determines whether or not the distance D computed at step S42 is a specific distance or greater, and processing proceeds to step S60 in a case in which the distance D is determined to be the specific distance or greater (step S43: YES). However, processing proceeds to step S61 in a case in which the distance D is determined by the CPU 31 to not be the specific distance or greater (step S43: NO).

At step S60, the CPU 31 instructs the notification section 37 so as to prioritize retreat notification over confirmation notification. As a result thereof, the notification section 37 executes retreat notification in priority over confirmation notification. The decision processing is then ended.

At step S61, the CPU 31 instructs the notification section 37 so as to prioritize confirmation notification over retreat notification. As a result thereof, the notification section 37 executes confirmation notification in priority over retreat notification. The decision processing is then ended.

Next, description follows regarding a specific example of prioritization control in the seventh exemplary embodiment, with reference to FIG. 11.

FIG. 11 illustrates a zone A and a zone B serving as a confirmation zone and a retreat zone as indicated by zone information. As an example, the zone A is a retreat zone in which a suspicious person was sighted in the past, and the zone B is a confirmation zone stipulated by the supervisor along the school route.

The current position of the user device 20 illustrated in FIG. 11 is a distance D away from a point of entry P to the zone A, namely away from a boundary of the zone A. The CPU 31 of the user device 20 instructs the notification section 37 so as to prioritize retreat notification over confirmation notification when the distance D is a specific distance or greater in such cases. However, the CPU 31 instructs the notification section 37 so as to prioritize confirmation notification over retreat notification when the distance D is not the specific distance or greater in such cases.

As described above, in the user device 20 the CPU 31 functions as the control section 31B to cause the notification section 37 to execute confirmation notification in priority over retreat notification in a case in which the current position of a user moving along a school route is contained in both a confirmation zone and a retreat zone. Thereby this user device 20 enables the user to be urged to confirm traffic safety on the school route by the confirmation notification being executed in priority over the retreat notification in a case in which there are plural executable notifications urging a safety related action to the user moving along the school route.

The CPU 31 in the user device 20 also functions as the control section 31B to cause the notification section 37 to execute retreat notification in priority over confirmation notification in a case in which the current position of a user moving along a school route is contained in both a confirmation zone and a retreat zone and is at the specific distance or greater away from the boundary of the retreat zone. Thereby this user device 20 enables a time to retreat from the retreat zone to be suppressed from being prolonged, by causing the retreat notification to be executed by the notification section 37 in priority over the confirmation notification in a case in which a user can be assumed to be moving toward a center of the retreat zone.

Eighth Exemplary Embodiment

Next, description follows regarding an eighth exemplary embodiment of the information processing system 10 according to the present exemplary embodiments, with description of common parts to other exemplary embodiments either abbreviated or omitted.

In the eighth exemplary embodiment, similarly to in the fifth exemplary embodiment to the seventh exemplary embodiment, the control section 31B performs periodic control to cause the notification section 37 to execute retreat notification in a case in which the current position of a user moving along a school route is contained in a retreat zone.

Figure 15:
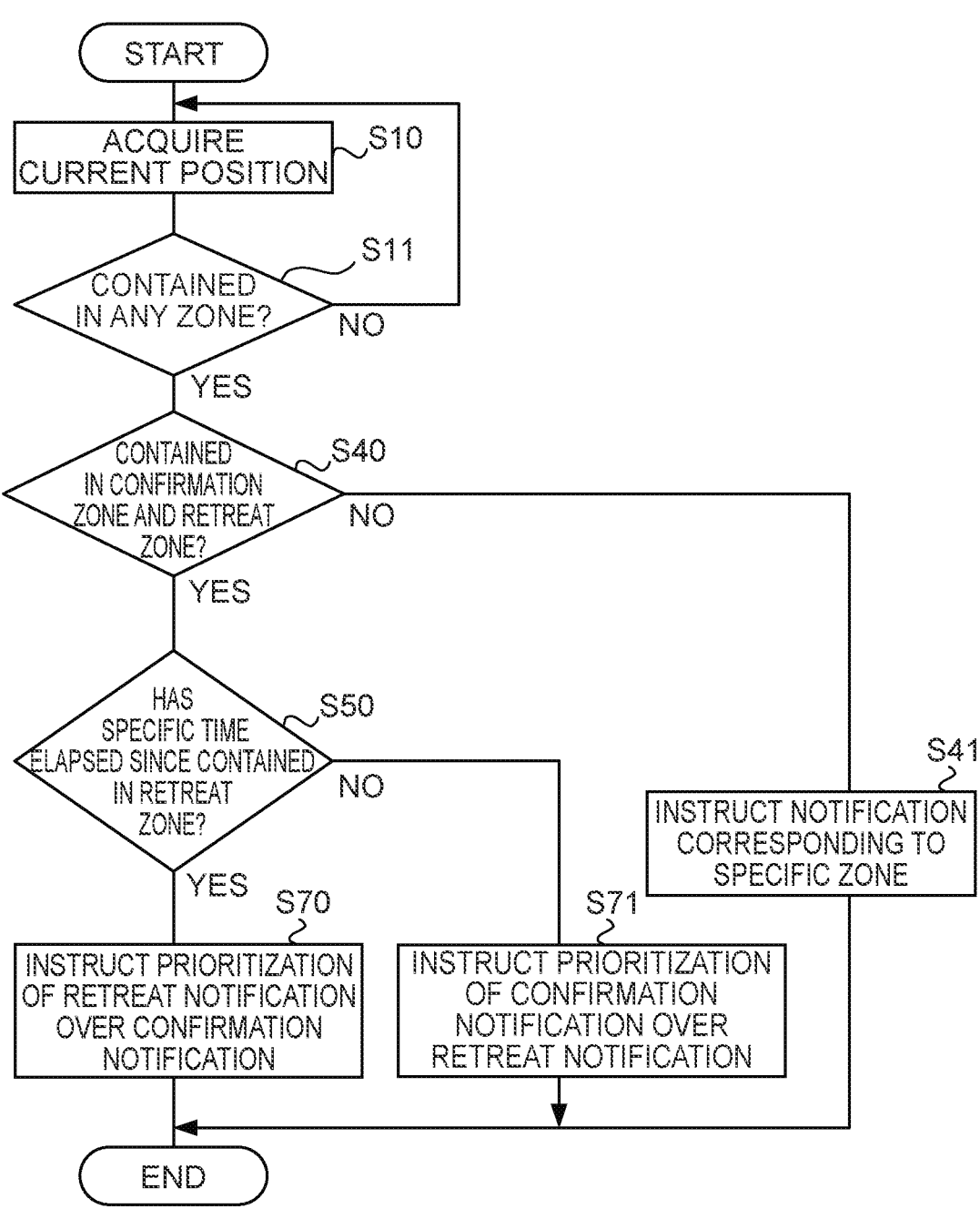
FIG. 15 is a seventh flowchart illustrating a flow of decision processing according to the present exemplary embodiment.

FIG. 15 is a seventh flowchart illustrating a flow of decision processing. Note that the processing of each step other than the step S70 and step S71 preceded by step S50 in the flowchart of FIG. 15 is similar to that in the flowchart illustrated in FIG. 12, and so description thereof will be omitted or abbreviated.

At step S50 illustrated in FIG. 15, the CPU 31 determines whether or not a specific period of time has elapsed since the current position of the user acquired at step S10 was contained in the retreat zone, and processing proceeds to step S70 in a case in which the specific period of time is determined to have elapsed (step S50: YES). However, processing proceeds to step S71 in a case in which determination by the CPU 31 is that the specific period of time has not elapsed since the current position of the user was contained in the retreat zone (step S50: NO).

At step S70, the CPU 31 instructs the notification section 37 so as to prioritize retreat notification over confirmation notification. As a result thereof, the notification section 37 executes retreat notification in priority over confirmation notification. The decision processing is then ended.

At step S71, the CPU 31 instructs the notification section 37 so as to prioritize confirmation notification over retreat notification. As a result thereof, the notification section 37 executes confirmation notification in priority over retreat notification. The decision processing is then ended.

Next, description follows regarding a specific example of prioritization control in the eighth exemplary embodiment, with reference to FIG. 13.

FIG. 13 illustrates a zone A and a zone B serving as a confirmation zone and a retreat zone indicated by the zone information. As an example, the zone A is a retreat zone in which a suspicious person was sighted in the past, and the zone B is a confirmation zone stipulated by the supervisor along the school route.

Consider a case in which, in a state in which the user device 20 is present at a position contained in both the zone A and the zone B illustrated in FIG. 13, a specific period of time has not elapsed from when the user carrying the user device 20 entered the zone A. In such cases, the CPU 31 of the user device 20 instructs the notification section 37 so as to prioritize confirmation notification over retreat notification. However, the CPU 31 instructs the notification section 37 so as to prioritize retreat notification over confirmation notification in a case in which, in a state in which the user device 20 is present at a position contained in both the zone A and the zone B illustrated in FIG. 13, the specific period of time has elapsed from when the user carrying the user device 20 entered the zone A.

As described above, in the user device 20 the CPU 31 functions as the control section 31B to cause the notification section 37 to execute retreat notification in priority over confirmation notification in a case in which the current position of a user moving along a school route is contained in both a confirmation zone and a retreat zone and a specific period of time has elapsed since being contained in the retreat zone. Thereby this user device 20 enables a time to retreat from the retreat zone to be suppressed from being prolonged, by causing the retreat notification to be executed by the notification section 37 in priority over the confirmation notification in a case in which a user can be assumed to be moving toward a center of the retreat zone.

Other

Although in the exemplary embodiments described above the user device 20 serves as an example of an information processing device, there is no limitation thereto, and the server 40 may serve as an example of an information processing device, and the user device 20 and the server 40 in combination may serve as an example of an information processing device. In a case in which the user device 20 and the server 40 act in combination to serve as an example of an information processing device, the decision processing may be executed by a single processor from out of the CPU 31 of the user device 20 or the CPU 41 of the server 40, or may be executed by a combination of plural processors, i.e. jointly by the CPU 31 of the user device 20 and the CPU 41 of the server 40.

Although in the exemplary embodiments described above the user device 20 is mounted to a shoulder strap of a school bag worn on the back of a user, the wearing location of the user device 20 is not limited thereto. For example, the user device 20 may be worn, for example, on clothes or the body of the user. Moreover, the user device 20 may be housed in a pocket of clothes of the user in a case in which the user device 20 is a mobile device such as a smartphone.

In the exemplary embodiment described above a parent serves as a supervisor of a user, however the supervisor of the user is not limited thereto. For example, the supervisor of the user may be another relative, such as a brother or sister, a grandparents, or the like, or may be a person other than a relative, such as a teacher in a primary school, an instructor in after-school childcare, or the like.

In the exemplary embodiment described above, the user is a child of lower primary school age, but the age of the user is not limited thereto. For example, the user may be a child below school age, a child of upper primary school age, a middle school pupil, a senior school pupil, or the like, or may be an elderly person without being limited to a child.

In the exemplary embodiments described above, along a school route serves as an example of along a path, however the school route may be a school route between school and home, or may be a school route between a facility for other learning activities, such as sports or cram schooling, and home.

In the exemplary embodiments described above the notification section 37 executes notification using vibration and audio, however, there is no limitation thereto, and notification may be executed using one out of vibration or audio. In a case in which there is a monitor provided to the user device 20, the notification section 37 may also execute notification using the monitor in addition to vibration and/or audio.

In the exemplary embodiments described above a specific notification was caused to be executed in priority over another notification in a case in which there are plural executable notifications urging a safety related action to the user moving along a school route, by the CPU 31 of the user device 20 causing the notification section 37 to execute the notification of the other notification after causing the notification section 37 to execute the specific notification. However, there is no limitation thereto, and causing a specific notification to be executed in priority over another notification may be by the CPU 31 performing control so as to cause the notification section 37 to execute the specific notification but then prioritized control so as to not cause the notification section 37 to execute the other notification.

In the exemplary embodiments described above the time information indicates a date and time when a concern to the safety of a user occurred in the past, however the time information may additionally contain a day of the week.

In the exemplary embodiments described above the CPU 31 causes the notification section 37 to execute a notification urging a safety related action when the user has entered a zone along a school route, however a timing of notification by the notification section 37 is not limited thereto. For example, the CPU 31 may perform control so as to cause the notification section 37 to execute notification when a distance between the current position of a user moving along a school route to a boundary of a zone is a specific distance or less. This thereby enables a safety related action to be urged to a user by the user device 20 before the user enters the zone.

In the present exemplary embodiment the user device 20 may include, in addition to the hardware configuration illustrated in FIG. 2 a motion sensor such as an angular velocity sensor, an accelerometer, a geomagnetic sensor, and the like. Doing so enables determination in the user device 20 as to whether or not the user is performing a safety related action. Note that in a case in which the user device 20 includes such a motion sensor, data may be stored in the storage section 34 regarding the presence or absence of a safety related action by the user as determined by the motion sensor in each zone along the school route where a safety related action is urged. Moreover, data stored in the storage section 34 regarding the presence or absence of a safety related action by the user may be transmitted from the user device 20 to the server 40. Then the server 40 may periodically generate a movement trace of the user taking into account the presence or absence of a safety related action along the school route, and also transmit the generated movement trace of the user to the supervisor device 60.

In the present exemplary embodiment the user device 20 may, in addition to acquiring the zone information from the server 40, also acquire zone information from the supervisor device 60.

In the exemplary embodiments described above, the server 40 acquired, from an external device, position information indicating a confirmation zone along the school route in which a traffic accident occurred in the past and a retreat zone along the school route in which a suspicious person has been sighted in the past or the like. When doing so, the external device may employ a data communication module (DCM) or the like provided to a server computer owned by a specific business operator or provided to a vehicle. In a case in which the external device is a DCM, the DCM transmits vehicle travel data obtained from DCM data to the server 40. The server 40 may then extract position information indicating a confirmation zone in which a traffic accident occurred in the past, a confirmation zone in which dangerous driving (for example: a stop sign violation, speeding, or the like) occurred in the past, or the like from the acquired vehicle travel data and store the extract position information in the storage section 44 as zone information.

In the exemplary embodiments described above the CPU 31 instructs the notification section 37 so as to prioritize retreat notification over confirmation notification in a case in which the distance between the current position of the user and a boundary of a retreat zone is less than the specific distance. However, there is no limitation thereto, and the CPU 31 may instruct the notification section 37 so as to prioritize confirmation notification over retreat notification even though the above distance is less than the specific distance in a case in which the above distance is gradually getting shorter, namely, in a case in which the user is approaching a boundary of a retreat zone. Moreover, the CPU 31 may instructs the notification section 37 so as to prioritize confirmation notification over retreat notification even though the above distance is less than the specific distance in a case in which a specific period of time has elapsed since the current position of the user became contained in a retreat zone.

In the exemplary embodiments described above the CPU 31 instructs the notification section 37 so as to prioritize confirmation notification over retreat notification in a case in which the distance between the current position of the user and a boundary of a retreat zone is less than the specific distance. However, there is no limitation thereto, and the CPU 31 may instruct the notification section 37 so as to prioritize retreat notification over confirmation notification even though the above distance is less than the specific distance in a case in which a specific period of time has elapsed since the current position of the user became contained in the retreat zone.

Note that the decision processing executed by the CPU 31 reading software (a program in the exemplary embodiments described above may be executed by various processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The decision processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although in the exemplary embodiments described above an embodiment was described in which the information processing program 34A is pre-stored (installed) in the storage section 34, there is no limitation thereto. The information processing program 34A may be provided in a format recorded on a recording medium such as a compact disk read only memory (CD-ROM), digital versatile disk read only memory (DVD-ROM), universal serial bus (USB) memory, or the like. The information processing program 34A may also be provided in a format downloadable from an external device over a network N.

What is claimed is:

1. An information processing device comprising:
a processor, wherein the processor is configured to:
acquire zone information indicating a zone in which a safety related action is urged to a user along a path;
measure a current position of the user moving along the path with a GPS device; and
in a case in which the current position of the user moving along the path is contained in a plurality of zones indicated by the acquired zone information, execute a notification corresponding to a zone having a high predetermined priority from among the plurality of zones, wherein:
the processor is configured to execute a notification corresponding to one of the zones indicated by the zone information as including time information related to a time when a concern with respect to safety of the user occurred in a past time from among the plurality of zones, in priority over a notification corresponding to another of the zones indicated by the zone information as not including the time information.

2. The information processing device of claim 1, wherein the zone indicated by the zone information as including the time information is a zone in which the concern occurred within a specific period of time from a current date and time.

3. The information processing device of claim 1, wherein the zone indicated by the zone information as including the time information is a zone in which the concern occurred in a time band relative to a specific period of time in the past time from a current date and time.

4. The information processing device of claim 1, wherein, in the case in which the current position of the user moving along the path is contained in the plurality of the zones indicated by the zone information containing the time information, the processor is configured to execute a notification corresponding to a zone having a most recent time the concern occurred as indicated in the time information from among the plurality of zones.

5. The information processing device of claim 1, wherein in the case in which the current position of the user moving along the path is contained in the plurality of the zones as indicated by the zone information containing the time information, the processor is configured to execute a notification corresponding to a zone having a most frequent occurrence of the concern per unit time from among the plurality of zones.

6. The information processing device of claim 1, wherein, in the case in which the current position of the user moving along the path is contained in the plurality of the zones as indicated by the zone information containing the time information, the processor is configured to execute a notification corresponding to a zone having a most recent time of occurrence of the concern in the past time to a current date and time from among the plurality of zones.

7. The information processing device of claim 1, wherein:
the plurality of zones includes:
a confirmation zone where the user is urged to perform a confirmation action to confirm traffic safety as the safety related action, and
a retreat zone where the user is urged to perform a retreat action to retreat from the current position as the safety related action; and
the processor is configured to execute a notification corresponding to the retreat zone in priority over a notification corresponding to the confirmation zone in a case in which the current position of the user moving along the path is contained in the confirmation zone and the retreat zone.

8. The information processing device of claim 7, wherein the processor is configured to execute the notification corresponding to the confirmation zone in priority over the notification corresponding to the retreat zone in the case in which the current position of the user moving along the path is contained in the confirmation zone and the retreat zone and is at a specific distance or greater away from a boundary of the retreat zone.

9. The information processing device of claim 7, wherein the processor is configured to execute the notification corresponding to the confirmation zone in priority over the notification corresponding to the retreat zone in the case in which the current position of the user moving along the path is contained in the confirmation zone and the retreat zone and a specific period of time has elapsed since being contained in the retreat zone.

10. The information processing device of claim 1, wherein:
the plurality of zones includes:
a confirmation zone where the user is urged to perform a confirmation action to confirm traffic safety as the safety related action, and
a retreat zone where the user is urged to perform a retreat action to retreat from the current position as the safety related action; and
the processor is configured to execute a notification corresponding to the confirmation zone in priority over a notification corresponding to the retreat zone in a case in which the current position of the user moving along the path is contained in the confirmation zone and the retreat zone.

11. The information processing device of claim 10, wherein the processor is configured to execute the notification corresponding to the retreat zone in priority over the notification corresponding to the confirmation zone in the case in which the current position of the user moving along the path is contained in the confirmation zone and the retreat zone and is at a specific distance or greater away from a boundary of the retreat zone.

12. The information processing device of claim 10, wherein the processor is configured to execute the notification corresponding to the retreat zone in priority over the notification corresponding to the confirmation zone in the case in which the current position of the user moving along the path is contained in the confirmation zone and the retreat zone and a specific period of time has elapsed since being contained in the retreat zone.

13. The information processing device of claim 1, wherein:
the user is a child of lower primary school age;
the path is a school route of the user; and
the information processing device is mounted to a shoulder strap of a school bag worn on a back of the user.

14. An information processing method comprising a computer executing processing comprising:
acquiring zone information indicating a zone in which a safety related action is urged to a user along a path;
measuring a current position of the user moving along the path with a GPS device;
in a case in which the current position of the user moving along the path is contained in a plurality of zones indicated by the acquired zone information, executing a notification corresponding to a zone having a high predetermined priority from among the plurality of zones; and
executing a notification corresponding to one of the zones indicated by the zone information as including time information related to a time when a concern with respect to safety of the user occurred in a past time from among the plurality of zones, in priority over a notification corresponding to another of the zones indicated by the zone information as not including the time information.

15. A non-transitory recording medium storing an information processing program executable by a computer to perform processing comprising:
acquiring zone information indicating a zone in which a safety related action is urged to a user along a path;
measuring a current position of the user moving along the path with a GPS device;
in a case in which the current position of the user moving along the path is contained in a plurality of zones indicated by the acquired zone information, executing a notification corresponding to a zone having a high predetermined priority from among the plurality of zones; and
executing a notification corresponding to one of the zones indicated by the zone information as including time information related to a time when a concern with respect to safety of the user occurred in a past time from among the plurality of zones, in priority over a notification corresponding to another of the zones indicated by the zone information as not including the time information.

* * * * *